(12) United States Patent
Aguilera et al.

(10) Patent No.: US 6,728,781 B1
(45) Date of Patent: Apr. 27, 2004

(54) HEARTBEAT FAILURE DETECTOR METHOD AND APPARATUS

(75) Inventors: Marcos K. Aguilera, Ithaca, NY (US); Wei Chen, Ithaca, NY (US); Sam Toueg, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/310,546

(22) Filed: May 12, 1999

Related U.S. Application Data

(60) Provisional application No. 60/085,161, filed on May 12, 1998.

(51) Int. Cl.[7] ............................................. G06F 15/173
(52) U.S. Cl. ..................... 709/240; 709/201; 709/223; 370/216; 714/4; 714/38
(58) Field of Search ................. 714/4, 14, 38; 709/239, 240, 223, 201; 370/217, 216

(56) References Cited

U.S. PATENT DOCUMENTS 5,390,326 A * 2/1995 Shah .......................... 370/222
6,324,161 B1 * 11/2001 Kirch .......................... 370/217

OTHER PUBLICATIONS

Robbert van Renesse et al., "A Gossip–Style Failure Detection Service", Dept. Comp. Science, Cornell University, pp. 1–16, 1996.*

* cited by examiner

Primary Examiner—Krisna Lim
Assistant Examiner—Yasin M Barqadle
(74) Attorney, Agent, or Firm—Jaeckle Fleischmann & Mugel, LLP

(57) ABSTRACT

The Heartbeat Failure Detector of the present invention, is a new, simple method and device that has several identical modules, and each module is attached to a processor in the system. Roughly speaking, the module of a processor x maintains a heartbeat counter for every other process. For each process y, the counter of y at x (called the heartbeat of y at x) periodically increases while y is alive and in the same network partition, and the counter stops increasing after y crashes or becomes partitioned away. Using such a device, x can solve the communication problem above by resending m only if the heartbeat of y at x increases. Note that if y is crashed (or partitioned away from x), its heartbeat at x stops almost immediately, and so x will also immediately stop sending copies of m to y.

26 Claims, 15 Drawing Sheets

A network that partitions (a) simple network case    (b) general network case    link is fair ———→ link is not fair - - - - - →

Examples of the simple and general network cases

For every process $p$:

To execute broadcast($m$):
    deliver($m$)
    for all $q \in neighbor(p)$ do SEND$_{p,q}(m)$
    return upon RECEIVE$_{p,q}(m)$ do
    if $p$ has not previously executed deliver($m$) then
        deliver($m$)
        for all $q \in neighbor(p)$ do SEND$_{p,q}(m)$ Quiescent implementation of reliable broadcast using a quiescent implementation of SEND and RECEIVE primitives between neighbors

Fig. 1-2

For process $s$:

Initialization:
  $seq \leftarrow 0$      { $seq$ is the current sequence number }

To execute $\text{SEND}_{s,r}(m)$:
  $seq \leftarrow seq + 1$
  fork task $repeat\_send(r, m, seq)$
  return task $repeat\_send(r, m, seq)$:
  $prev\_hb\_r \leftarrow -1$
  repeat periodically
    $hb \leftarrow \mathcal{D}_p$      { query the heartbeat failure detector }
    if $prev\_hb\_r < hb[r]$ then
      $send_{s,r}(\text{MSG}, m, seq)$
      $prev\_hb\_r \leftarrow hb[r]$
  until $receive_{s,r}(\text{ACK}, seq)$ from $r$ For process $r$:

upon $receive_{r,s}(\text{MSG}, m, seq)$ do
  if this is the first time $r$ receives $(\text{MSG}, m, seq)$ from $s$ then $\text{RECEIVE}_{r,s}(m)$
  $send_{r,s}(\text{ACK}, seq)$ Simple network case — quiescent implementation of $\text{SEND}_{s,r}$ and $\text{RECEIVE}_{r,s}$ using $\mathcal{HB}$ for $r \in neighbor(s)$

Fig. 1-3

For every process $p$:

To execute broadcast($m$):
    deliver($m$)
    $got[m] \leftarrow \{p\}$
    fork task $diffuse(m)$
    return task $diffuse(m)$:
    for all $q \in neighbor(p)$ do $prev\_hb[q] \leftarrow -1$
    repeat periodically
        $hb \leftarrow \mathcal{D}_p$      { query the heartbeat failure detector }
        if for some $q \in neighbor(p)$, $q \notin got[m]$ and $prev\_hb[q] < hb[q]$ then
            for all $q \in neighbor(p)$ such that $prev\_hb[q] < hb[q]$ do $send_{p,q}(m, got[m], p)$
            $prev\_hb \leftarrow hb$
    until $neighbor(p) \subseteq got[m]$ upon $receive_{p,q}(m, got\_msg, path)$ do
    if $p$ has not previously executed deliver($m$) then
        deliver($m$)
        $got[m] \leftarrow \{p\}$
        fork task $diffuse(m)$
    $got[m] \leftarrow got[m] \cup got\_msg$
    $path \leftarrow path \cdot p$
    for all $q$ such that $q \in neighbor(p)$ and $q$ appears at most once in $path$ do
        $send_{p,q}(m, got[m], path)$ General network case — quiescent implementation of broadcast and deliver using $\mathcal{HB}$

Fig. 1-4

For every process $p$:

Initialization:
    for all $q \in neighbor(p)$ do $\mathcal{D}_p[q] \leftarrow 0$ cobegin
  || *Task 1*:
    repeat periodically
      for all $q \in neighbor(p)$ do $send_{p,q}(\text{HEARTBEAT})$

|| *Task 2*:
    upon $receive_{p,q}(\text{HEARTBEAT})$ do
      $\mathcal{D}_p[q] \leftarrow \mathcal{D}_p[q] + 1$ coend Simple network case — implementation of $\mathcal{HB}$

Fig. 1-5

For every process $p$:

Initialization:
    for all $q \in neighbor(p)$ do $\mathcal{D}_p[q] \leftarrow 0$ cobegin

|| *Task 1*:
    repeat periodically
        for all $q \in neighbor(p)$ do $send_{p,q}$(HEARTBEAT, $p$)

|| *Task 2*:
    upon $receive_{p,q}$(HEARTBEAT, *path*) do
        for all $q$ such that $q \in neighbor(p)$ and $q$ appears in *path* do
            $\mathcal{D}_p[q] \leftarrow \mathcal{D}_p[q] + 1$
        *path* $\leftarrow$ *path* $\cdot p$
        for all $q$ such that $q \in neighbor(p)$ and $q$ does not appear in *path* do
            $send_{p,q}$(HEARTBEAT, *path*)

coend

General network case — implementation of $\mathcal{HB}$

Fig. 1-6

For process $s$:

Initialization:
  $seq \leftarrow 0$   { $seq$ is the current sequence number }

To execute R-SEND$_{s,r}(m)$:
  $seq \leftarrow seq + 1$
  $lseq \leftarrow seq$
  broadcast$(m, lseq, s, r)$
  wait until RECEIVEd (ACK, $lseq$) from $t+1$ processes
  return For every process $p$:

upon deliver$(m, lseq, s, r)$ do
    SEND$_{p,s}$(ACK, $lseq$)
    if $p = r$ then R-RECEIVE$_{r,s}(m)$ Quiescent implementation of R-SEND$_{s,r}$ and R-RECEIVE$_{r,s}$ for $n > 2t$

Fig. 1-7

For every process $p$:

To execute uniform-broadcast($m$):
    broadcast($m$)
    return upon deliver($m$) do
    for all $q \in \Pi$ do SEND$_{p,q}$(ACK, $m$)
    wait until RECEIVEd (ACK, $m$) from $t+1$ processes
    uniform-deliver($m$)

Quiescent implementation of uniform reliable broadcast for $n > 2t$

Fig. 1-8

A network that partitions

For every process $p$:

To execute broadcast($m$):
    deliver($m$)
    $got[m] \leftarrow \{p\}$
    fork task *diffuse*($m$)
    return task *diffuse*($m$):
    for all $q \in neighbor(p)$ do $prev\_hb[q] \leftarrow -1$
    repeat periodically
        $hb \leftarrow \mathcal{D}_p$                                                                                                           {query $\mathcal{HB}$}
        if for some $q \in neighbor(p)$, $q \notin got[m]$ and $prev\_hb[q] < hb[q]$ then
            for all $q \in neighbor(p)$ such that $prev\_hb[q] < hb[q]$ do send $(m, got[m], p)$ to $q$
        $prev\_hb \leftarrow hb$
    until $neighbor(p) \subseteq got[m]$ upon receive $(m, got\_msg, path)$ from $q$ do
    if $p$ has not previously executed deliver($m$) then
        deliver($m$)
        $got[m] \leftarrow \{p\}$
        fork task *diffuse*($m$)
    $got[m] \leftarrow got[m] \cup got\_msg$
    $path \leftarrow path \cdot p$
    for all $q$ such that $q \in neighbor(p)$ and $q$ appears at most once in $path$ do
        send $(m, got[m], path)$ to $q$ Quiescent implementation of broadcast and deliver using $\mathcal{HB}$

Fig. 2-2

For every process $p$:

To execute propose($v_p$):
    $estimate_p \leftarrow v_p$      {$estimate_p$ is $p$'s estimate of the decision value}
    $state_p \leftarrow undecided$
    $r_p \leftarrow 0$      {$r_p$ is $p$'s current round number}
    $ts_p \leftarrow 0$      {$ts_p$ is the last round in which $p$ updated $estimate_p$, initially 0}
    repeat      {Rotate through coordinators until decision is reached}
        $r_p \leftarrow r_p + 1$
        $c_p \leftarrow (r_p \bmod n) + 1$      {$c_p$ is the current coordinator}

Phase 1:
            qr-send $(p, r_p, estimate_p, ts_p)$ to $c_p$

Phase 2:
            if $p = c_p$ then
                wait until [for $\lceil(n+1)/2\rceil$ processes $q$: qr-received $(q, r_p, estimate_q, ts_q)$ from $q$]
                $msgs_p[r_p] \leftarrow \{(q, r_p, estimate_q, ts_q) \mid p$ qr-received $(q, r_p, estimate_q, ts_q)$ from $q\}$
                $t \leftarrow$ largest $ts_q$ such that $(q, r_p, estimate_q, ts_q) \in msgs_p[r_p]$
                $estimate_p \leftarrow$ select one $estimate_q$ such that $(q, r_p, estimate_q, t) \in msgs_p[r_p]$
                qr-send $(p, r_p, estimate_p)$ to all

Phase 3:
            wait until [qr-received $(c_p, r_p, estimate_{c_p})$ from $c_p$ or $D_p$ suspects $c_p$]      {query $\Diamond\mathcal{S}_{LP}$}
            if [qr-received $(c_p, r_p, estimate_{c_p})$ from $c_p$] then
                $estimate_p \leftarrow estimate_{c_p}$
                $ts_p \leftarrow r_p$
                qr-send $(p, r_p, ack)$ to $c_p$
            else qr-send $(p, r_p, nack)$ to $c_p$

Phase 4:
            if $c = c_p$ then
                wait until [for $\lceil(n+1)/2\rceil$ processes $q$: qr-received $(q, r_p, ack)$ or $(q, r_p, nack)$]
                if [for $\lceil(n+1)/2\rceil$ processes $q$: qr-received $(q, r_p, ack)$] then
                    broadcast $(p, r_p, estimate_p, decide)$      {reliable broadcast the decision value}
    until $state_p = decided$ upon deliver$(q, r_q, estimate_q, decide)$
    if $state_p = undecided$ then
        decide($estimate_q$)
        $state_p \leftarrow decided$ Consensus for partitionable networks using $\Diamond\mathcal{S}_{LP}$ and reliable communication primitives

Fig. 2-3

For every process $p$:

Initialization:
    for all $q \in \Pi$ do $\mathcal{D}_p[q] \leftarrow 0$                                                              {$\mathcal{D}_p$ is the output of $\mathcal{HB}$ at $p$} cobegin
  || Task 1:
       repeat periodically
           $\mathcal{D}_p[p] \leftarrow \mathcal{D}_p[p] + 1$                                             {increment $p$'s own heartbeat}
           for all $q \in neighbor(p)$ do send (HEARTBEAT, $p$) to $q$

|| Task 2:
       upon receive (HEARTBEAT, $path$) from $q$ do
           for all $q \in \Pi$ such that $q$ appears after $p$ in $path$ do
               $\mathcal{D}_p[q] \leftarrow \mathcal{D}_p[q] + 1$
           $path \leftarrow path \cdot p$
           for all $q$ such that $q \in neighbor(p)$ and $q$ appears at most once in $path$ do
               send (HEARTBEAT, $path$) to $q$
coend Implementation of $\mathcal{HB}$ for partitionable networks

Fig. 2-4

Cycle of dependencies when network connectivity is defined in terms of messages sent For every process $p$:

Initialization:
        for all $q \in \Pi$ do $f[q] \leftarrow \bot$
        $Order \leftarrow \emptyset$
        $Sequences \leftarrow \{\lambda\}$
        $\mathcal{D}'_p \leftarrow \emptyset$
        { For each $\emptyset \subset P, P_0 \subseteq \Pi$, the set $E^{\mathcal{D},\mathcal{E}}_{P,P_0}$ is determined *a priori* from $\mathcal{D}$ and $\mathcal{E}$ } cobegin
      || *Task 1*:
        repeat periodically
            $v \leftarrow \mathcal{D}_p$                                                                          {query $\mathcal{D}$}
            append $(p, v)$ to each sequence in *Sequences*
            for all $q \in \Pi$ do send (*Sequences*, $v$) to $q$

|| *Task 2*:
        upon receipt of (*Sequences'*, $v'$) from $q$ do
            $f[q] \leftarrow v'$
            $Order \leftarrow q \,||\, (Order \setminus \{q\})$         {process $q$ is moved to the front of $Order$}
            $Sequences \leftarrow Sequences \cup Sequences'$
            if for some $k \geq 1$, *AllowsRRI*(*Sequences*, $Order[1..k], f$) then
                let $k_0$ be the largest such $k$
                if for some $k' \geq 1$, $f \in E^{\mathcal{D},\mathcal{E}}_{Order[1..k'],Order[1..k_0]}$ then
                    let $k_1$ be the smallest such $k'$
                    $\mathcal{D}'_p \leftarrow \Pi \setminus Order[1..k_1]$     {suspect processes not in $Order[1..k_1]$}
    coend Transformation of $\mathcal{D}$ to an eventually perfect failure detector $\mathcal{D}'$

Fig. 2-6

For every process $p$:

Initialization:
        for all $q \in \Pi$ do $f[q] \leftarrow \perp$
        $Order \leftarrow \emptyset$
        $\mathcal{D}'_p \leftarrow \emptyset$
        { For each $\emptyset \subset P \subseteq \Pi$, the set $E_P^{\mathcal{D},\mathcal{E}}$ is determined *a priori* from $\mathcal{D}$ and $\mathcal{E}$ } cobegin
        || *Task 1*:
            repeat periodically
                $v \leftarrow \mathcal{D}_p$                                                                                    {query $\mathcal{D}$}
                for all $q \in \Pi$ do send $v$ to $q$

|| *Task 2*:
            upon receipt of $w$ from $q$ do         {upon receipt of a failure detector value from $q$}
                $f[q] \leftarrow w$
                $Order \leftarrow q \parallel (Order \setminus \{q\})$         {process $q$ is moved to the front of $Order$}
                if for some $k \geq 1$, $f \in E_{Order[1..k]}^{\mathcal{D},\mathcal{E}}$ then
                      let $k_0$ be the smallest such $k$
                      $\mathcal{D}'_p \leftarrow \Pi \setminus Order[1..k_0]$               {suspect processes not in $Order[1..k_0]$}
    coend Transformation of $\mathcal{D}$ to an eventually perfect failure detector $\mathcal{D}'$ in environment $\mathcal{E}$

Fig. 2-7

HEARTBEAT FAILURE DETECTOR METHOD AND APPARATUS

This application claims the benefit of the priority date of U.S. provisional patent application, Ser. No. 60/085,161, filed May 12, 1998.

STATEMENT REGARDING FEDERALLY SPONSORED RESEARCH OR DEVELOPMENT

This invention was made with Government support from the National Science Foundation (NSF) under Grant No. CCR-9402896. The Government has certain rights in the invention.

BACKGROUND

As the use of computer networks in safety-critical systems increases (e.g., fly-by-wire commercial aircraft systems, automated train and subway operation systems, airline traffic control systems, medical systems, banking and stock market systems, etc.) the demand for fault-tolerant and highly-available distributed systems also rapidly increases. A crucial component of any such system is reliable communication. As such, there is a urgent need for a method and apparatus that can monitor network systems with process crashes, message losses, and network partitioning. Furthermore, such a method or apparatus could also be used to provide efficient solutions of several other core components of fault-tolerant distributed systems, such as Consensus, Atomic Broadcast, and Atomic Commitment.

Computer networks are often subject to failure. Typically these failures include crashes of processors and processes, message losses, and network partitioning. With such failures, achieving reliable communication is difficult and expensive. The following simple example illustrates the basic problem.

Suppose process x sends a message m to process y, but x does not receive the acknowledgment ack(m) indicating that y received m. Should x keep on trying to send copies of m to y, or should it give up? The answer depends on why x is not receiving ack(m) from y. It could be either because (a) y has crashed or is partitioned away from x, or because (b) the copies of m or ack(m) sent so far were lost due to transient link failures. In the first case x should not continue resending m (because it is useless and thus a waste of network resources), and in the second case, x should try to resend m again. The problem is that x cannot distinguish between the two cases.

To deal with this problem, existing communication protocols either use timeouts or limit the number of allowed retransmissions. In the first scheme, x keeps on resending copies of m until its timeout period expires, and in the second scheme, it resends m until it reaches the maximum allowed number of retransmissions. If processor x gets no acknowledgments by then, it gives up sending m to y. This type of solution is problematic for two reasons. First, the selection of an adequate timeout period, or of the maximum number of retransmissions, is difficult because it depends on many system parameters that may change over time. Second, x sends several copies of m toy even if y is actually crashed (or partitioned away from x)—a waste of network bandwidth.

SUMMARY

The Heartbeat Failure Detector is a new, simple method and device that solves the above problem. This device has several identical modules, and each module is attached to a processor in the system. Roughly speaking, the module of a processor x maintains a heartbeat counter for every other process. For each process y, the counter of y at x (called the heartbeat of y at x) periodically increases while y is alive and in the same network partition, and the counter stops increasing after y crashes or becomes partitioned away. Using such a device, x can solve the communication problem above by resending m only if the heartbeat of y at x increases. Note that if y is crashed (or partitioned away from x), its heartbeat at x stops almost immediately, and so x will also immediately stop sending copies of m to y.

An important feature of the Heartbeat Failure Detector is that it can easily be implemented without using timeouts. The detailed specification shows how to implement the Heartbeat Failure Detector in several types of networks where processes may crash and links may lose messages. In particular, we consider networks where all communication links are bidirectional, networks where some links are unidirectional, and networks that may partition. The basic ideas behind these implementations are as follows. For networks that do not partition, processors (processes) periodically broadcast "heartbeat" messages: whenever a processor x receives a heartbeat message from a processor y, it increments the heartbeat counter of y at x. For networks that may partition, x increments the heartbeat counter of y each time x receives a heartbeat message that was sent by x and later relayed by y.

Note that the Heartbeat Failure Detector does not use timeouts on the heartbeats of a process in order to determine whether this process has failed or not. The Heartbeat Failure Detector just counts the total number of heartbeats received from each process, and outputs these "raw" counters without any further processing or interpretation. Thus, the Heartbeat Failure Detector should not be confused with existing implementations of failure detectors (some of which, such as those in Ensemble and Phoenix, have modules that are also called heartbeat). Even though existing failure detectors are also based on the repeated sending of a periodic message, they use timeouts on these messages in order to derive lists of processes considered to be up or down; applications can only see these lists. In contrast, the Heartbeat Failure Detector simply counts heartbeats, and shows these counts to applications.

The Heartbeat Detector works with partitionable networks with process crashes and lossy links, and is applicable to the problems of reliable communication and consensus for such networks. For both problems we developed algorithms that are quiescent, i.e., algorithms that eventually stop sending messages. We first tackle the problem of reliable communication for partitionable networks by extending the results of simple point-to-point solutions. In particular, we generalize the specification of the heartbeat failure detector (hereinafter "HB"), show how to implement it, and show how to use it to achieve quiescent reliable communication. We also show how to use the HB for consensus for partitionable networks. We first show that, even though this problem can be solved using a natural extension of failure detector~S, such solutions are not quiescent—in other words, S alone is not sufficient to achieve a quiescent consensus in partitionable networks. We then solve this problem using~S and the quiescent reliable communication primitives that we developed for the HB.

For those skilled in the art who desire further proof of the efficacy of the invention, we provide an Appendix of lemma showing how the invention necessarily performs its disclosed operations.

BRIEF DESCRIPTION OF THE DRAWINGS

The above-mentioned and other features and advantages of this invention, and the manner of attaining them, will become apparent and be better understood by reference to the following description of the embodiments of the invention in conjunction with the accompanying drawings, wherein:

FIG. 1-2 shows the quiescent implementation of reliable broadcast using a quiescent implementation of SEND and RECEIVE primitives between neighbors;

FIG. 1-3 shows a simple network case with quiescent implementation of $SEND_{s,r}$ and $RECEIVE_{r,s}$ using HB for r ∈ neighbor(s);

FIG. 1-4 shows a general network case with quiescent implementation of broadcast and deliver using HB;

FIG. 1-5 shows a simple network case with implementation of HB;

FIG. 1-6 shows a general network case with implementation of HB;

FIG. 1-7 shows a quiescent implementation of $R\text{-}SEND_{s,r}$ and $R\text{-}RECEIVE_{r,s}$ for n>2t;

FIG. 1-8 shows a quiescent implementation of uniform reliable broadcast for n>2t;

FIG. 2-1 is a schematic of a network that partitions;

FIG. 2-2 shows a quiescent implementation of broadcast and deliver using HB;

FIG. 2-3 shows a consensus for partitionable networks using $\Diamond S_{LP}$ and reliable communication primitives;

FIG. 2-4 shows an implementation of HB for partitionable networks;

FIG. 2-5 is a schematic of a cycle of dependencies when network connectivity is defined in terms of messages sent;

FIG. 2-6 shows a transformation of D to an eventually perfect failure detector D'; and FIG. 2-7 is shows a transformation of D to an eventually perfect failure detector D' in environment ε.

Figure 1:
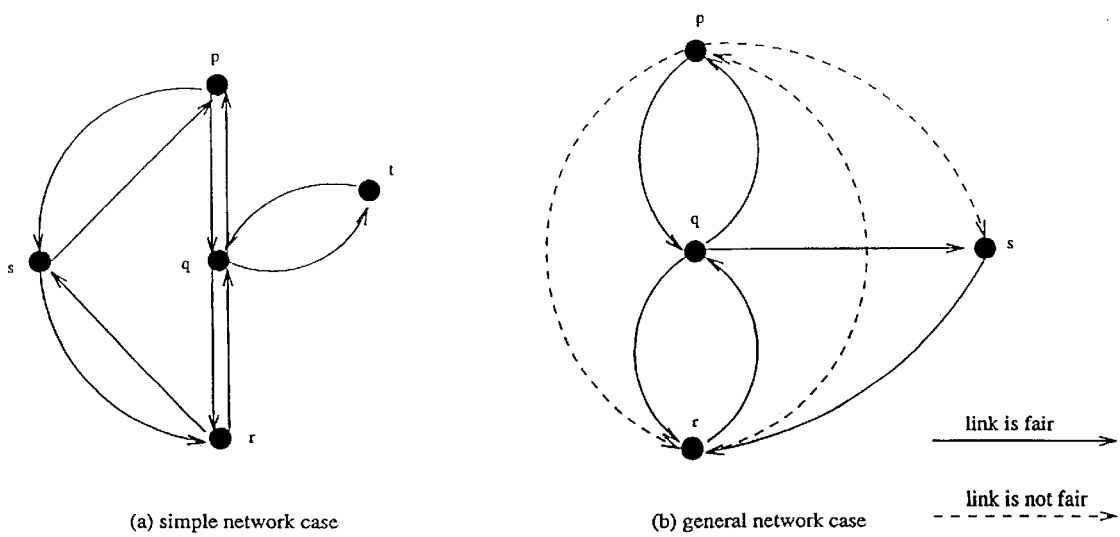
FIG. 1-1 is a schematic of examples of the simple and general network cases.

The examples set out illustrate certain embodiments of the invention but do not delineate the scope of the invention.

DETAILED DESCRIPTION

The Detailed Description is given in two parts. Part 1 describes a fundamental network with a heartbeat detector and Part 2 describes a partitionable network and a consensus network, each with heartbeat detectors. Other examples are given of how prior art networks and algorithms are improved with the invention.

Those skilled in the art will understand that the invention may be included in single computer and be used to monitor operation of key subsystems and peripheral attached to a computer. In a similar manner, the invention may be incorporated into computer networks that rely upon a token ring or an Ethernet structure. The invention is also applicable to switched networks, such as telephone networks. It may also be used with wired, wireless or cellular networks for telephones and computers.

The invention is implemented in hardware, software and combinations of both. In its essential form, the invention provides a heartbeat detector. The detector generates a periodic heartbeat signal, but the heartbeat signal may be nonperiodic as well. The detector is any suitable transmission device that transmits a heartbeat signal. The heartbeat detector appends data to the signal identifies the source of the heartbeat. The identification data may be a network address or a telephone number or a simpler code that identifies the transmitter of the heartbeat signal. The detector includes one or more storage locations of devices such as registers or spaces in a memory. The storage devices have counters that count the heartbeats of the other processes, computers or telephones that are connected to the network. Each time the detector receives a heartbeat signal from another entity, the count is recorded in the counter associated with the other entity or node. When the counter stops increasing, the heartbeat detector interrupts sending messages to the entity that whose heartbeat has stopped. This conserves a time and network bandwidth by reducing messages sent to a crashed entity. When the count resumes (when the entity comes back on line) the message may be sent again.

PART 1

1 Motivation

This paper introduces heartbeat, a failure detector that can be implemented without timeouts, and shows how it can be used to solve the problem of quiescent reliable communication in asynchronous message-passing systems with process crashes and lossy links.

To illustrate this problem consider two processes, a sender s and a receiver r, connected by an asynchronous bidirectional link. Process s wishes to send some message m to r. Suppose first that no process may crash, but the link between s and r may lose messages (in both directions). If we put no restrictions on message losses it is obviously impossible to ensure that r receives m. An assumption commonly made to circumvent this problem is that the link is fair: if a message is sent infinitely often then it is received infinitely often.

With such a link, s could repeatedly send copies of m forever, and r is guaranteed to eventually receive m. This is impractical, since s never stops sending messages. The obvious fix is the following protocol: (a) s sends a copy of m repeatedly until it receives ack(m) from r, and (b) upon each receipt of m, r sends ack(m) back to s. Note that this protocol is quiescent: eventually no process sends or receives messages.

The situation changes if, in addition to message losses, process crashes may also occur. The protocol above still works, but it is not quiescent anymore: for example, if r crashes before sending ack(m), then s will send copies of m forever. Is there a quiescent protocol ensuring that if neither s nor r crashes then r eventually receives m? It turns out that the answer is no, even if one assumes that the link can only lose a finite number of messages.

Since process crashes and message losses are common types of failures, this negative result is an obstacle to the design of fault-tolerant distributed systems. In this paper, we explore the use of unreliable failure detectors to circumvent this obstacle. Roughly speaking, unreliable failure detectors provide (possibly erroneous) hints on the operational status of processes. Each process can query a local failure detector module that provides some information about which processes have crashed. This information is typically given in the form of a list of suspects. In general, failure detectors can make mistakes: a process that has crashed is not necessarily suspected and a process may be suspected even though it has not crashed. Moreover, the local lists of suspects dynamically change and lists of different processes do not have to agree (or even eventually agree). Introduced in [CT96], the abstraction of unreliable failure detectors has been used to solve several important problems such as consensus, atomic broadcast, group membership, non-blocking atomic commitment, and leader election [BDM97, DFKM96, Gue95, LH94, SM95].

Our goal is to use unreliable failure detectors to achieve quiescence, but before we do so we must address the following important question. Note that any reasonable implementation of a failure detector in a message-passing system is itself not quiescent: A process being monitored by a failure detector must periodically send a message to indicate that it is still alive, and it must do so forever (if it stops sending messages it cannot be distinguished from a process that has crashed). Given that failure detectors are not quiescent, does it still make sense to use them as a tool to achieve quiescent applications (such as quiescent reliable broadcast, consensus, or group membership)?

The answer is yes, for two reasons. First, a failure detector is intended to be a basic system service that is shared by many applications during the lifetime of the system, and so its cost is amortized over all these applications. Second, failure detection is a service that needs to be active forever—and so it is natural that it sends messages forever. In contrast, many applications (such as a single RPC call or the reliable broadcast of a single message) should not send messages forever, i.e., they should be quiescent. Thus, there is no conflict between the goal of achieving quiescent applications and the use of a (non-quiescent) failure detection service as a tool to achieve this goal.

How can we use an unreliable failure detector to achieve quiescent reliable communication in the presence of process and link failures? Consider the Eventually Perfect failure detector ◇ P [CT96]. Intuitively, ◇ P satisfies the following two properties: (a) if a process crashes then there is a time after which it is permanently suspected, and (b) if a process does not crash then there is a time after which it is never suspected. Using ◇ P, the following obvious algorithm solves our sender/receiver example: (a) while s has not received ack(m) from r, it periodically does the following: s queries ◇ P and sends a copy of m to r if r is not currently suspected; (b) upon each receipt of m, r sends ack(m) back to s. Note that this algorithm is quiescent: eventually no process sends or receives messages.

In [ACT97a], Aguilera et al. show that among all failure detectors that output lists of suspects, ◇ P is the weakest one that can be used to solve the above problem.[1] Unfortunately, ◇ P is not implementable in asynchronous systems with process crashes (this would violate a known impossibility result [FLP85, CT96]). Thus, at a first glance, it seems that achieving quiescent reliable communication requires a failure detector that cannot be implemented. In this paper we show that this is not so.

The Heartbeat Failure Detector

We will show that quiescent reliable communication can be achieved with a failure detector that can be implemented without timeouts in systems with process crashes and lossy links. This failure detector, called heartbeat and denoted HB is very simple. Roughly speaking, the failure detector module of HB at a process p outputs a vector of counters, one for each neighbor q of p. If neighbor q does not crash, its counter increases with no bound. If q crashes, its counter eventually stops increasing. The basic idea behind an implementation of HB is the obvious one: each process periodically sends an I-am-alive message (a "heartbeat") and every process receiving a heartbeat increases the corresponding counter.[2]

Note that HB does not use timeouts on the heartbeats of a process in order to determine whether this process has failed or not. HB just counts the total number of heartbeats received from each process, and outputs these "raw" counters without any further processing or interpretation.

Thus, HB should not be confused with existing implementations of failure detectors (some of which, such as those in Ensemble and Phoenix, have modules that are also called heartbeat [vR97, Cha97]). Even though existing failure detectors are also based on the repeated sending of a heartbeat, they use timeouts on heartbeats in order to derive lists of processes considered to be up or down; applications can only see these lists. In contrast, HB simply counts heartbeats, and shows these counts to applications.

A remark is now in order regarding the practicality of HB. As we mentioned above, HB outputs a vector of unbounded counters. In practice, these unbounded counters are not a problem for the following reasons. First, they are in local memory and not in messages—our HB implementations use bounded messages (which are actually quite short). Second, if we bound each local counter to 64 bits, and assume a rate of one heartbeat per nanosecond, which is orders of magnitude higher than currently used in practice, then HB will work for more than 500 years.

HB can be used to solve the problem of quiescent reliable communication and it is implementable, but its counters are unbounded. Can we solve this problem using a failure detector that is both implementable and has bounded output? [ACT97a] proves that the answer is no: The weakest failure detector with bounded output that can be used to solve quiescent reliable communication is ◇ P.

Thus, the difference between HB, whose output is unbounded, and existing failure detectors, whose output is bounded, is more than "skin deep". The results in this paper combined with those of [ACT97a], show that failure detectors with bounded output (including those that output lists of processes) are restricted in power and/or applicability.

3 Outline of the Results

We focus on two types of reliable communication mechanisms: quasi reliable send/receive and reliable broadcast. Roughly speaking, a pair of send/receive primitives is quasi reliable if it satisfies the following property: if processes s and r are correct (i.e., they do not crash), then r receives a message from s exactly as many times as s sent that message to r. Reliable broadcast [HT941 ensures that if a correct process broadcasts a message m then all correct processes deliver m; moreover, all correct processes deliver the same set of messages.

We first show that there is no quiescent implementation of quasi reliable send/receive or of reliable broadcast in a network with process crashes and message losses. This holds even if we assume that links can lose only a finite number of messages.

We then show how to use failure detectors to circumvent the above impossibility result. We describe failure detector HB, and show that it is strong enough to achieve quiescent reliable communication, but weak enough to be implementable, in each one of the following two types of communication networks. In both types of networks, we assume that each correct process is connected to every other correct process through a fair path, i.e., a path containing only fair links and correct processes. This assumption precludes permanent network partitioning. In the first type, all links are bidirectional and fair (FIG. 1a). In the second one, some links are unidirectional, and some links have no restrictions on message losses, i.e., they are not fair (FIG. 1b). Examples of such networks are networks that contain several unidirectional rings that intersect.

For each network type, we first describe quiescent protocols that use HB, to solve quasi reliable send/receive and reliable broadcast, and then show how to implement HB. For the first type of networks, a common one in practice, the implementation of HB and the reliable communication protocols are very simple and efficient The algorithms for the second type are significantly more complex.

We also briefly consider two stronger types of communication primitives, namely, reliable send and receive, and uniform reliable broadcast, and give quiescent implementations that use HB. These implementations assume that a majority of processes are correct (a result in [BCBT96] shows that this assumption is necessary).

We then explain how HB can be used to easily transform many existing algorithms that tolerate process crashes into quiescent algorithms that tolerate both process crashes and message losses (fair links). This transformation can be applied to the algorithms for consensus in [Ben83, Rab83, BT85, CMS89, FM90, AT96, CT96I], for atomic broadcast in [CT96], for k-set agreement in [Cha93], for atomic commitment in [Gue95], for approximate agreement in [DLP+86], etc.

Finally, we show that HB can be used to extend the work in [BCBT96] to obtain the following result. Let P be a problem. Suppose P is correct-restricted (i.e., its specification refers only to the behavior of correct processes) or a majority of processes are correct. If P is solvable with a quiescent protocol that tolerates only process crashes, then P is also solvable with a quiescent protocol that tolerates process crashes and message losses. The link failure model in (BCBT96] is slightly different from the one used here (cf. Section 11).

To summarize, the main contributions of this paper are:
1. This is the first work that explores the use of unreliable failure detectors to achieve quiescent reliable communication in the presence of process crashes and lossy links—a problem that cannot be solved without failure detection.
2. We describe a simple and implementable failure detector HB that can be used to solve this problem.
3. HB can be used to extend existing algorithms for many fundamental problems (e.g., consensus, atomic broadcast, k-set agreement, atomic commitment, approximate agreement) to tolerate message losses. It can also be used to extend the results of [BCBT96].
4. HB, is novel: it is implementable without timeouts, and it does not output lists of suspects as typical failure detectors do [BDM97, CT96, Gue95, GLS95, LH94, SM95]. The results of this paper, combined with those in [ACT97a], show that lists of suspects is not always the best failure detector output. The authors of [CHT96I] anticipated this possibility: they put no restrictions on the output of unreliable failure detectors when they determine the weakest one necessary to solve consensus.

Reliable communication is a fundamental problem that has been extensively studied, especially in the context of data link protocols (see Chapter 22 of [Lyn96] for a compendium). Our work differs from previous results by focusing on the use of unreliable failure detectors to achieve quiescent reliable communication in the presence of process crashes and link failures. The work by Basu et al. in [BCBT96] is the closest to ours, but their protocols do not use failure detectors and are not quiescent. In Section 11, we use HB to extend the results of [BCBT96] and obtain quiescent protocols.

The paper is organized as follows. Our model is given in Section 4. Section 5 defines the reliable communication primitives that we focus on. In Section 6, we show that, without failure detectors, quiescent reliable communication is impossible. To overcome this problem, we define heartbeat failure detectors in Section 7, we show how to use them to achieve quiescent reliable communication in Section 8, and show how to implement them in Section 9. In Section 10, we consider two stronger types of communication primitives. In Section 11, we explain how to use heartbeat failure detectors to extend several previous results. In Section 12, we mention a generalization of our results for the case where the network may partition. A brief discussion of protocol quiescence versus protocol termination concludes the paper.

4 Model

We consider asynchronous message-passing distributed systems in which there are no timing assumptions. In particular, we make no assumptions on the time it takes to deliver a message, or on relative process speeds. Processes can communicate with each other by sending messages through the network. We do not assume that the network is completely connected or that the links are bidirectional. The system can experience both process failures and link failures. Processes can fail by crashing, and links can fail by dropping messages.

To simplify the presentation of our model, we assume the existence of a discrete global clock. This is merely a fictional device: the processes do not have access to it. We take the range T of the clock's ticks to be the set of natural numbers.

4.1 Processes and Process Failures

The system consists of a set of n processes, $\Pi = \{1, \ldots, n\}$. Processes can fail by crashing, i.e., by prematurely halting. A failure pattern F is a function from T to $2^\Pi$, where F(t) denotes the set of processes that have crashed through time t. Once a process crashes, it does not "recover", i.e., $\forall t$: $F(t) \subseteq F(t+1)$. We define crashed(F)=$\cup_{t \in T}$ F(t) and correct (F)=$\Pi$−crashed(F). If p $\in$ crashed (F) we say p crashes (or is faulty)in F and if p $\in$ correct (F) we say p is correct in F.

4.2 Links and Link Failures

Some pairs of processes in the network are connected through unidirectional links. If there is a link from process p to process q, we denote this link by p→q, and if, in addition, q≠p we say that q is a neighbor of p. The set of neighbors of p is denoted by neighbor(p).

With every link p→q we associate two primitives: $send_{p,q}(m)$ and $receive_{q,p}(m)$. We say that process p sends message m to process q if p invokes $send_{p,q}(m)$. We assume that if p is correct, it eventually returns from this invocation. We allow process p to send the same message m more than once through the same link. We say that process q receives message m from process p if q returns from the execution of $receive_{q,p}(m)$. We describe a link p→q by the properties that its $send_{p,q}$ and $receive_{q,p}$ primitives satisfy. We assume that links do not create messages, i.e., every link p→q in the network satisfies:

Integrity: For all k≥1, if q receives m from p k times, then p previously sent m to q at least k times.

A lossy link can fail by dropping messages. A link p→q is fair if $send_{p,q}$ and received satisfy Integrity and:

Fairness: If q is correct and p sends m to q an infinite number of times, then q receives m from p an infinite number of times.

4.3 Network Connectivity

A path $(p_1, \ldots, p_k)$ is fair processes $p_1, \ldots, p_k$ are correct and links $p_1 \rightarrow p_2, \ldots, p_{k-1} \rightarrow p_k$ are fair. We assume that every pair of distinct correct processes is connected through a fair path. Without loss of generality, we can assume that this path is simple (i.e., no process appears twice in that path).

4.4 Failure Detectors

Each process has access to a local failure detector module that provides (possibly incorrect) information about the failure pattern that occurs in an execution. A process can query its local failure detector module at any time. A failure detector history H with range R is a function from $\Pi \times T$ to R. $H(p, t)$ is the output value of the failure detector module of process p at time t. A failure detector D is a function that maps each failure pattern F to a set of failure detector histories with range RD (where RD denotes the range of failure detector outputs of D). $D(F)$ denotes the set of possible failure detector histories permitted by D for the failure pattern F. We stress that the output of a failure detector depends only on the failure pattern F; it cannot depend on the behavior of applications. This means that failure detectors can neither obtain feedback from applications nor be used by applications to transmit information in any manner.

As an example, consider a Strong failure detector D [CT96]. Each failure detector module of D outputs a set of processes that are suspected to have crashed, i.e., $R_D = 2^\Pi$. D satisfies the following two properties:

Strong Completeness: Eventually every process that crashes is permanently suspected by every correct process. More precisely:
$\forall F, \forall H \in D(F), \exists t \in T, \forall p \in$ crashed(F),
$\forall q \in$ correct(F), $\exists t' > t: p \in H(q, t')$ Weak Accuracy: Some correct process is never suspected. More precisely:
$\forall F, \forall H \in D(F), \exists p \in$ correct(F),
$\forall t \in T, \forall q \in$ -F(t): $p \notin H(q, t)$ The class of all failure detectors that satisfy the above two properties is denoted S.

Let C be a class of failure detectors. An algorithm solves a problem using C if it can solve this problem using any $D \in C$. An algorithm implements C if it implements some $D \in C$.

5 Quiescent Reliable Communication

In this paper, we focus on quasi reliable send and receive and reliable broadcast, because these communication primitives are sufficient to solve many problems (see Section 11.1). We also briefly consider stronger types of communication primitives—reliable send and receive, and uniform reliable broadcast—in Section 10.

5.1 Quasi Reliable Send and Receive

Consider any two distinct processes s and r. We define quasi reliable send and receive from s to r in terms of two primitives, $send_{s,r}$ and $receiver_{r,s}$, that must satisfy Integrity and the following property:

Quasi No Loss[6]: For all $k \geq 1$, if both s and r are correct and s sends into r exactly k times, then r receives m from s at least k times.

Note that Quasi No Loss together with Integrity implies that for all $k \geq 0$, if both s and r are correct and s sends m to r exactly k times, then r receives m from s exactly k times.

We want to implement quasi reliable send/receive primitives using the (lossy) send/receive primitives that are provided by the network. In order to differentiate between these two, the first set of primitives is henceforth denoted by SEND/RECEIVE, and the second one, by send/receive. Informally, an implementation of $SEND_{s,r}$ and $RECEIVER_{r,s}$ is quiescent if a finite number of invocations of $SEND_{s,r}$ cause only a finite number of invocations of sends throughout the network.

5.2 Reliable Broadcast

Reliable broadcast [BT85] is defined in terms of two primitives: broadcast(m) and deliver(m). We say that process p broadcasts message m if p invokes broadcast(m). We assume that every broadcast message m includes the following fields: the identity of its sender, denoted sender(m), and a sequence number, denoted seq(m). These fields make every message unique. We say that q delivers message m if q returns from the invocation of deliver(m). Primitives broadcast and deliver satisfy the following properties [HT94]:

Validity: If a correct process broadcasts a message m, then it eventually delivers m.

Agreement: If a correct process delivers a message m, then all correct processes eventually deliver m.

Uniform Integrity: For every message m, every process delivers m at most once, and only if m was previously broadcast by sender(m).

A stronger property, called No Loss, is used in Section 10.1 to define reliable send and receive.

We want to implement reliable broadcast using the (lossy) send and receive primitives that are provided by the network. Informally, an implementation of reliable broadcast is quiescent if a finite number of invocations of broadcast cause only a finite number of invocations of sends throughout the network.

5.3 Relation between Reliable Broadcast and Quasi Reliable Send and Receive

From a quiescent implementation of quasi reliable send and receive one can easily obtain a quiescent implementation of reliable broadcast, and vice versa.

Remark 1 From any quiescent implementation of reliable broadcast, we can obtain a quiescent implementation of the quasi reliable primitives $SEND_{p,q}$ and $RECEIVE_{q,p}$, for every pair of processes p and q.

The implementation is trivial: to SEND a message m to q, p simply broadcasts the message M=(m, p, q, k) using the given quiescent implementation of reliable broadcast, where sender(M)=p and seq(M)=k, a sequence number that p has not used before. Upon the delivery of (m p, q, k), a process r RECEIVEs m from p if r=q, and discards m otherwise. This implementation of $SEND_{p,q}$ and $RECEIVE_{q,p}$ is clearly correct and quiescent.

Remark 2 Suppose that every pair of correct processes is connected through a path of correct processes. If we have a quiescent implementation of quasi reliable primitives $SEND_{p,q}$ and $RECEIVE_{q,p}$ for all processes p and q E neighbor(p), then we can obtain a quiescent implementation of reliable broadcast.

Figures 1, 2:
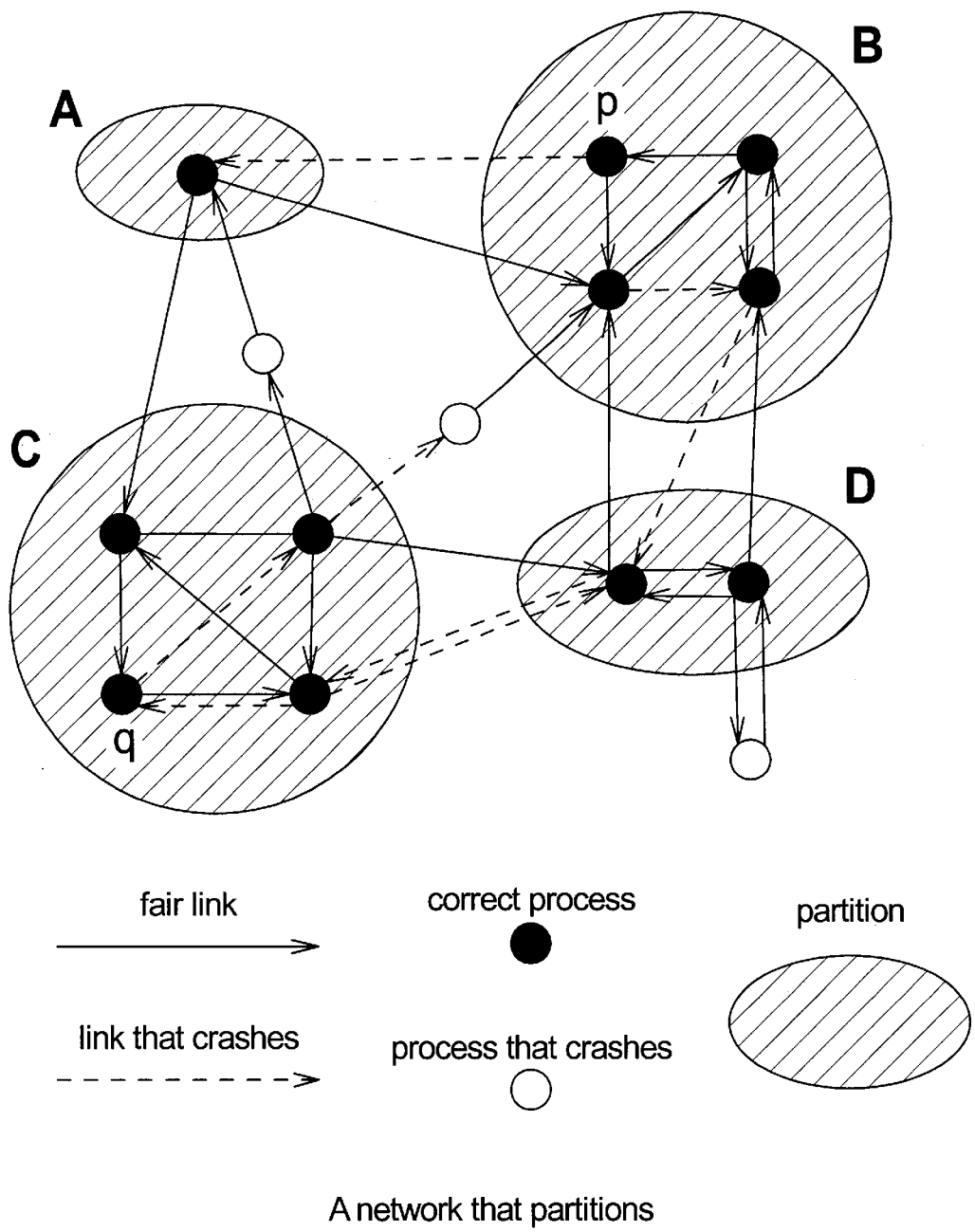

The implementation of reliable broadcast, a simple flooding algorithm taken from [HT94], is given in FIG. 2 (the code consisting of lines 9 and 10 is executed atomically[7]). It is clear that this implementation is quiescent. Indeed, for every message m, an invocation of broadcast(m) can cause at most n−1 invocations of SEND per process. Moreover, since the implementation of SEND is quiescent, each invocation of SEND causes only a finite number of invocations of sends. Thus, a finite number of invocations of broadcast causes a finite number of invocations of sends. A process p executes a region of code atomically if at any time there is at most one thread of p in this region.

6 Impossibility of Quiescent Reliable Communication

Quiescent reliable communication cannot be achieved in a network with process crashes and message losses. This holds even if the network is completely connected, only a finite number of messages can be lost, and processes have access to a Strong failure detector.

Theorem 1. Consider a network where every pair of processes is connected by a fair link and at most one process may crash. Let s and r be any two distinct processes. There is no quiescent implementation of quasi reliable send and receive from s to r. This holds even if we assume that only a finite number of messages can be lost, and the implementation can use S.

Proof (Sketch). Assume, by contradiction, that there exists a quiescent implementation I of quasi reliable $SEND_{s,r}$, and $RECEIVE_{r,s}$ using S. We now construct three runs of I, namely, $R_0$, $R_1$ and $R_2$, in which only S may SEND a message M to r and no other process invokes any SEND.

In run $R_0$, s SENDs no messages, all processes are correct, all messages are received one time unit after they are sent, and the failure detector behaves perfectly (i.e., no process suspects any other process). Since I is quiescent, there is a time $t_0$ after which no messages are sent or received. By the Integrity property of SEND and RECEIVE, process r never RECEIVES any message.

Run $R_1$ is identical to run $R_0$ up to time $t_0$; at time $t_0+1$, s SENDs M to r, and r crashes; after time $t_0+1$, no processes crash, and all messages are received one time unit after they are sent; at all times, the failure detector behaves perfectly (i.e., r is suspected by all processes from time $t_0+1$ on, and there are no other suspicions). Since I is quiescent, there is a time $t_1 > t_0$ after which no messages are sent or received.

In run $R_2$, r and its failure detector module behave exactly as in run $R_0$ (in particular, r does not crash and r receives a message in m $R_2$ whenever it receives m in $R_0$); all other processes and their failure detector modules behave exactly as in run $R_1$ (in particular, a process p≠r receives a message in m in $R_2$ whenever it receives in m $R_1$). Note that, in $R_2$, if messages are sent to or from r after time $t_0$, then they are never received.

We now show that in $R_2$ the send and receive primitives satisfy the Integrity property. Assume that for some k≧1, some process q receives m from some process p k times. There are several cases. (1) If q=r then r receives m from p k times in $R_0$ (since r behaves in the same way in $R_0$ and $R_2$). In $R_0$, by the Integrity property of send and receive, p sent m to r at least k times. This happens by time $t_0$, since there are no sends in $R_0$ after time $t_0$. Note that by time $t_0$, p behaves exactly in the same way in $R_0$, $R_1$ and $R_2$. Thus p sent m to r at least k times by time $t_0$ in $R_2$. (2) If q≠r and p=r, then q receives m from r k times in $R_1$ (since q behaves in the same way in $R_1$ and $R_2$). In $R_1$, by the Integrity property of send and receive, r sent m to q at least k times. This happens by time $t_0$, since r crashes at time $t_0+1$ in $R_1$. By time $t_0$, r behaves exactly in the same way in $R_0$, $R_1$ and $R_2$. Thus r sent m to q at least k times by time $t_0+1$ in $R_2$. (3) If q≠r and p≠r, then q receives m from p k times in $R_1$ (since q behaves in the same way in $R_1$ and $R_2$). By the Integrity property of send and receive in $R_1$, p sent m to q at least k times. Note that p behaves exactly in the same way in $R_1$ and $R_2$. Thus p sent m to q at least k times in $R_2$. Therefore, the send and receive primitives in $R_2$ satisfy the Integrity property.

We next show that in $R_2$ the send and receive primitives satisfy the Fairness property, and in fact only a finite number of messages are lost. Note that r sends only a finite number of messages in $R_0$ (since it does not send messages after time $t_0$ and every process p≠r sends only a finite number of messages in $R_1$ (since it does not send messages after time $t_1$). So, by construction of $R_2$, all processes send only a finite number of messages in $R_2$. Therefore, only a finite number of messages are lost, and the send and receive primitives satisfy the Fairness property.

Finally, we show that in $R_2$ the failure detector satisfies the properties of a Strong failure detector. Indeed, there are no crashes and therefore Strong Completeness holds vacuously; also there exists a process, namely s, which is never suspected by any process, and so Weak Accuracy holds.

We conclude that $R_2$ is a possible run of I using S in a network with fair links that lose only a finite number of messages. Note that in $R_2$: (a) both s and r are correct; (b) s SENDs M to r; and (c) r does not RECEIVE M. This violates the Quasi No Loss property of $SEND_{s,r}$ and $RECEIVE_{r,s}$ and so I is not an implementation of $SEND_{s,r}$ and $RECEIVE_{r,s}$—a contradiction.

Theorem 1 and Remark 1 Immediately Imply:

Corollary 2 There is no quiescent implementation of reliable broadcast, even if the implementation can use S.

To overcome these impossibility results, we now introduce the heartbeat failure detector.

7 Definition of HB

A heartbeat failure detector D has the following features. The output of D at each process p is a list $(p_1,n_1)$, $(p_2,n_2), \ldots, (p_k,n_k)$, where $P_1, P_2, \ldots, p_k$ are the neighbors of p, and each $n_j$ is a nonnegative integer. Intuitively, $n_j$ increases while $P_j$ has not crashed, and stops increasing if $p_j$ crashes. We say that $n_j$ is the heartbeat value of $p_j$ at p. The output of D at p at time t, namely H(p,t), will be regarded as a vector indexed by the set $\{p_1, p_2, \ldots, p_k\}$ Thus, H(p,t)[$p_j$] is $n_j$. The heartbeat sequence of $p_j$ at p is the sequence of the heartbeat values of $p_j$ at p as time increases. D satisfies the following properties:

HB-Completeness: At each correct process, the heartbeat sequence of every faulty neighbor is bounded.

Formally:

∀F, ∀H, ∈D(F), ∀p ∈correct (F), ∀q ∈crashed(F) ∩ neighbor(p) ∃K ∈ N ∀t ∈T: H(p,t)[q]≦K HB-Accuracy:

At each process, the heartbeat sequence of every neighbor is nondecreasing. Formally:

∀F, ∀H ∈ D(F), ∀p ∈ Π
∀q ∈ neighbor (p), ∀t ∈T:
H(p,t)[q]≦H(p,t+1)[q]

At each correct process, the heartbeat sequence of every correct neighbor is unbounded.

Formally:

∀F, ∀H ∈ D(F), ∀p ∈ correct(F),
∀q ∈ correct (F) ∩ neighbor (p),
∀K ∈ N, ∃E ∈ T: H(p,t)[q]>K The class of all heartbeat failure detectors is denoted HB. By a slight abuse of notation, we sometimes use HB to refer to an arbitrary member of that class.

It is easy to generalize the definition of HB so that the failure detector module at each process p outputs the heartbeat of every process in the system [ACT97b], rather than just the heartbeats of the neighbors of p, but we do not need this generality here.

8 Quiescent Reliable Communication Using HB

The communication networks that we consider are not necessarily completely connected, but we assume that every pair of correct processes is connected through a fair path. We first consider a simple type of such networks, in which every link is assumed to be bidirectional[8] and fair (FIG. 1a). This assumption, a common one in practice, allows us to give efficient and simple algorithms. We then drop this assumption and treat a more general type of networks, in which some links may be unidirectional and/or not fair (FIG. 1b). For both network types, we give quiescent reliable communication algorithms that use HB. Our algorithms have the following feature: processes do not need to know the entire network topology or the number of processes in the system; they only need to know the identity of their neighbors.

In our algorithms, $D_p$ denotes the current output of the failure detector D at process p.

8.1 The Simple Network Case

We assume that all links in the network are bidirectional and fair (FIG. 1a). We first give a quiescent implementation of quasi reliable $SENDS_{s,r}$ and $RECEIVE_{r,s}$ for the case r ∈ neighbor(s) (see FIG. 3). To SEND a message m to r, process s first forks the task repeat_send(r, m, seq) where seq is a fresh sequence number, and then it returns from this SEND. Task repeat_send(r, m, seq), which runs in the background, repeatedly send (MSG, m, seq) to r, where MSG is a tag. This send occurs every time s queries its failure detector module and notices that the heartbeat value of r has increased. The task repeat_send terminates if s receives an acknowledgement (ACK, seq) from r. This acknowledgement is sent by r every time it receives (MSG,m, seq). Process r RECEIVEs m at the first time it receives (MSG, m, seq).

The code consisting of lines 7 and 8 is executed atomically, as well as the code consisting of lines 23 and 24. If there are several concurrent executions of the repeat_send task (lines 11–18), then each execution must have its own private copy of all the local variables in this task, namely, r, m, seq. hb and prev_hb_r.

Figures 2, 3, 4, 5:
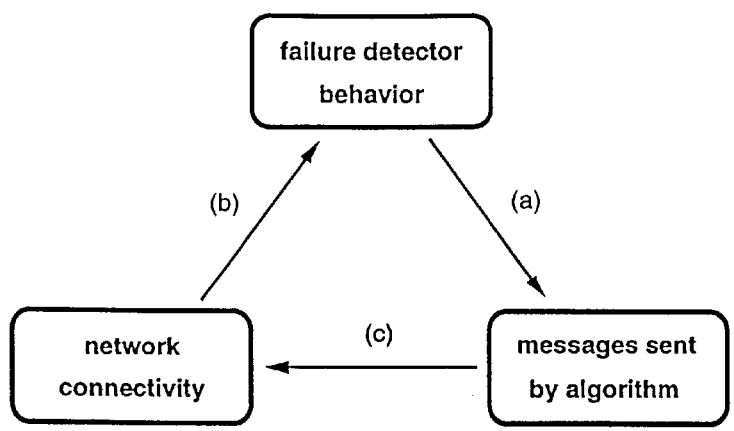

We now show that the algorithm of FIG. 3 is correct and quiescent. Note that all variables are local to each process. When ambiguities may arise, a variable local to process p is subscripted by p, e.g., $hb_p$ is the local variable hb of process p.

Lemma 3 (Integrity) For all k≧1, if r RECEIVEs m from s k times, then s SENT m to r at least k times.

Proof. Note that, for any sn, r only RECEIVEs m from s on the first time it receives (MSG, m, sn) from s. Since r RECEIVEs m k times then there are k different values $sn_1 \ldots, sn^k$ such that r receives (MSG, m, $sn_j$) from s for each j ∈ {1, ..., k}. By the Integrity property of send and receive, s sends (MSG, m, $sn_j$) to r before r receives (MSG, m, $sn_j$) from s. This send can only occur in line 16 of Task repeat_send(r, m, $sn_j$). For each j ∈ {1, ..., k}, Task repeat_send(r, m, $sn_j$) can only be forked during an invocation of $SEND_{s,r}(m)$, and each such invocation forks only one task repeat_send. Therefore, s SENT m to r at least k times.

Let m be a message and k≧1, and consider a run in which s invokes $SEND_{s,r}(m)$ exactly k times. For j=1, ..., k, we can associate a sequence number $sn_j$ with the j-th invocation of $SEND_{s,r}(m)$ as follows: we let $sn_j$ be the value of the global variable seq after line 7 is executed during the j-th invocation.[9] Note that if i≠j then $sn_i \neq sn_j$, since during each invocation of $SEND_{s,r}$ the global variable seq is increased by one, and it can never be decreased.

In our model, this means that link p→q is in the network if and only if link q→p is in the network. In other words, q ∈ neighbor(p) if and only if p ∈ neighbor(q).

If s crashes during the j-th invocation before executing line 7, we let $sn_j$ be equal to one plus the value of the global variable seq at the time of the invocation.

Lemma 4(Quasi No Loss) For all k≧1, if both s and r are correct and s SENDs m to r exactly k times, then r RECEIVEs m from s at least k times.

Proof. Suppose, by contradiction, that r RECEIVEs m from s less than k times. Notice that r RECEIVEs m from s every time it receives from s a message of the form (MSG, m, *) that it did not receive before. Let $sn_j$ be the sequence number associated with the j-th invocation of $SEND_{s,r}(m)$. Since all the $sn_j$'s are distinct, there is some j ∈{1, ..., k} such that (MSG, m, $sn_j$) is never received by r from s. Since each sequence number is associated with a unique message, r sends (ACK, $sn_j$) only if it receives (MSG,m, sn,). We conclude that r never sends (ACK, $sn_j$) to s. By the Integrity property of send and receive, s never receives (ACK, $sn_j$) from r. When s invokes $SEND_{s,r}(m)$ for the j-th time, it forks a task repeat send to repeatedly send (MSG, m, $sn_j$) to r. This task will be referred to as task T. Task T never terminates, because it can only do so if s crashes or if s receives (ACK, $sn_j$) from r. Therefore, the loop in lines 13–18, of task T is repeated infinitely often. Moreover, since r is correct, the HB-Accuracy property guarantees that the heartbeat sequence of r at s is nondecreasing and unbounded, and thus the condition in line 15 evaluates (in task 7) to true an infinite number of times. Therefore s sends (MSG, m, $sn_j$) to r an infinite number of times. By the Fairness property of send and receive, r receives (MSG, m, $sn_j$) from s at least once—a contradiction.

We now show that the implementation in FIG. 3 is quiescent. In order to do so, we focus on a single invocation of SEND and show that it causes only a finite number of invocations of sends. This immediately implies that a finite number of invocations of SENDs cause only a finite number of invocations of sends. So consider one particular invocation I of $SEND_{s,r}(m)$, and let sn be the sequence number associated with I. It is clear that, if s does not crash, I causes invocations of $send_{s,r}$(MSG, m, sn) in task repeat_send(r, m, sn). When r receives (MSG,m,sn) from s, it invokes $send_{r,s}$(ACK,sn). So I may also cause invocations of $send_{r,s}$ (ACK, sn), and it is clear that I does not cause any other invocations of sends. Therefore, a send caused by I is either $send_{s,r}$(MSG, m, sn) or $send_{r,s}$(ACK, sn).

We next show that s sends (MSG,m, sn) to r only a finite number of times, and that r sends (ACK, sn) to a only a finite number of times. This implies that I causes only a finite number of sends.

Lemma 5 s sends (MSG, m, sn) to r an infinite number of times if and only if r sends (ACK, sn) to a an infinite number of times.

Proof. If s sends (MSG, m, sn) to r an infinite number of times, then s is correct, and the condition in line 15 evaluates to true an infinite number of times. Therefore, the heartbeat sequence of r at s is unbounded. So, by HB-Completeness, r is correct. Then by the Fairness property of send and receive, r receives (MSG, m, sn) an infinite number of times. Since r sends (ACK, sn) to s each time it receives (MSG, m, sn). r sends (ACK, sn) to s an infinite number of times.

Conversely, if r sends (ACK, sn) to s an infinite number of times, then r receives (MSG, m, sn) an infinite number of times, so, by the Integrity property of send and receive, s sends (MSG, m, sn) to r an infinite number of times.

Corollary 6 s sends (MSG, m, sn) to r only a finite number of times.

Proof. For a contradiction, suppose that s sends (MSG, m, sn) to r an infinite number of times. Then r sends (ACK, sn) to s an infinite number of times by Lemma 5. By the Fairness property of send and receive, s eventually receives (ACK, sn) from r. Thus, the condition in line 18 (of task repeat_send(r, m,sn)) becomes true. Therefore, the task repeat_send (r,m, sn) eventually terminates and so it sends (MSG, m, sn) to r only a finite number of times—a contradiction.

Corollary 7 r sends (ACK, sn) to s only a finite number of times.

Proof. From Lemma 5 and Corollary 6.

Lemma 8 The algorithm of FIG. 3 is quiescent.

Proof. From Corollaries 6 and 7, and the remarks before Lemma 5.

From Lemmata 3,4, and 8 we have:

Theorem 9 For the simple network case and any $r \in$ neighbor(s), FIG. 3 is a quiescent implementation of quasi reliable $SEND_{s,r}$ and $RECEIVE_{r,s}$ that uses HB.

From this theorem, and Remarks 1 and 2, we have:

Corollary 10 In the simple network case, quasi reliable send and receive between every pair of processes and reliable broadcast can both be implemented with quiescent algorithms that use HB.

8.2 The General Network Case

In this case (FIG. 1b), some links may be unidirectional, e.g., the network may contain several unidirectional rings that intersect with each other. Moreover, some links may not be fair (and processes do not know which ones are fair).

Achieving quiescent reliable communication in this type of network is significantly more complex than before. For instance, suppose that we seek a quiescent implementation of quasi reliable send and receive. In order for the sender s to SEND a message m to the receiver r, it has to use a diffusion mechanism, even if r is a neighbor of s (since link s→r may be unfair). Because of intermittent message losses, this diffusion mechanism needs to ensure that in is repeatedly sent over fair links. But when should this repeated send stop? One possibility is to use an acknowledgement mechanism. Unfortunately, the link in the reverse direction may not be fair (or may not even be part of the network), and so the acknowledgement itself has to be "reliably" diffused—a chicken and egg problem.

FIG. 4 shows a quiescent implementation of reliable broadcast (by Remark 1 it can be used to obtain quasi reliable send and receive between every pair of processes). For each message m that is broadcast, each process p maintains a variable $got_p(m)$ containing a set of processes. Intuitively, a process q is in $got_p(m)$ if p has evidence that q has delivered m. In order to broadcast a message m, p first delivers m; then p initializes variable $got_p(m)$ to {p} and forks task diffuse (m); finally p returns from the invocation of broadcast(m). The task diffuse(m) at p runs in the background. In this task, p periodically checks if, for some neighbor q $\notin got_p(m)$, the heartbeat of q at p has increased, and if so, p sends a message containing m to all neighbors whose heartbeat increased—even to those who are already in $got_p(m)$.[10] The task terminates when all neighbors of p are contained in $got_p(m)$.

All messages sent by the algorithm are of the form (m, got_msg, path) where got_msg is a set of processes and path is a sequence of processes. Upon the receipt of such a message, process p first checks if it has already delivered m and, if not, it delivers m and forks task diffuse(m). Then p adds the contents of got_msg to $got_p(m)$ and appends itself to path. Finally, p forwards the new message (m, got_msg, path) to all its neighbors that appear at most once in path.

The code consisting of lines 18 through 26 is executed atomically. Each concurrent execution of the diffuse task (lines 9 to 16) has its own private copy of all the local variables in this task, namely m, hb, and prev_hb.

We now show that this implementation is correct and quiescent.

Lemma 11 (Uniform Integrity) For every message m, every process delivers message m at most once, and only if m was previously broadcast by sender(m).

Proof (Sketch). Let m be a message and p be a process. Line 19 guarantees that p delivers m at most once. Now suppose process p delivers m. It can do that either in line 4 or line 20. In the first case, p previously broadcast m and clearly p=sender(m). In the second case, p must have received a message of the form (m,*, *). By the Integrity property of send and receive, a message of the form (m,*, *) was previously sent. An easy induction shows that this can only happen if m was previously broadcast by sender(m).

Lemma 12 (Validity) If a correct process broadcasts a message m, then it eventually delivers m.

Proof. If a correct process broadcasts m then it eventually executes line 4 and delivers m.

We next show that every process in $got_p(m)$ delivered m. But first, we should be concerned about when the initialization of $got_p(m)$ takes place. We do not assume $got_p(m)$ is initialized to the empty set at start-up. Doing so would be impractical since the set of all possible messages m that can ever be broadcast can be infinite. Instead, each process p initializes $got_p(m)$ either when it broadcasts m (see line 5), or when it first "hears" about m (see line 21). This guarantees that $got_p(m)$ is never used before it is initialized. We next establish invariants for $got_p(m)$, but one should always keep in mind that these invariants only hold after initialization has occurred.

It may appear that p does not need to send this message to processes in got,(mj. since they already got it! The reader should verify that this "optimization's would make the algorithm fail.

Lemma 13 For any processes p and q, (1) if at some time t, q $\in got_p(m)$ then q $\in got_p(m)$ at every time t'$\geq$t; (2) When $got_p(m)$ is initialized, p $\in got_p(m)$; (3) if q $\in got_p(m)$ then q delivered m.

Proof (Sketch). (1) and (2) are clear from the algorithm and (3) follows from the Integrity property of send and receive.

Lemma 14 For every m and path, there is a finite number of distinct messages of the form (m, *, path).

Proof. Any message of the form (m, *, path) is equal to (m, g, path) for some g $\subseteq \Pi$, where $\Pi$ is a finite set.

Lemma 15 Suppose link p→q is fair, and p and q are correct processes. If p delivers a message m, then q eventually delivers m.

Proof. Suppose, by contradiction, that p delivers m and q never delivers m. Since p delivers m and it is correct, it forks task diffuse(m). Since q does not deliver m, by Lemma 13 part (3) q never belongs to $got_p(m)$. Since p is correct, this implies that p executes the loop in lines 11–6 an infinite number of times. Since q is a correct neighbor of p, the HB-Accuracy property guarantees that the heartbeat sequence of q at p is nondecreasing and unbounded. Thus, the condition in line 13 evaluates to true an infinite number of times. Therefore, p executes line 14 an infinite number of times, and so p sends a message of the form (M, *,p) to q an infinite number of times. By Lemma 14, there exists a subset $g_0 \subseteq \Pi$ such that p sends message (m, $g_0$, p) infinitely often to q. So, by the Fairness property of send and receive, q eventually receives (m, $g_0$,p). Therefore, q delivers m. This contradicts the assumption that q does not deliver m.

Lemma 16 (Agreement) If a correct process delivers a message m, then all correct processes eventually deliver m.

Proof. Suppose that some correct process p delivers m. For every correct process q, there is a simple fair path $(p_1, \ldots, p_k)$ from p to q with $p_1$=p and $p_k$=q. By successive applications of Lemma 15, we conclude that $p_2, p_3, \ldots, p_k$ eventually deliver m. Therefore q=$p_k$ eventually delivers m.

We now show that the implementation of FIG. 4 is quiescent. In order to do so, we focus on a single invocation of broadcast and show that it causes only a finite number of invocations of sends. This implies that a finite number of invocations of broadcast cause only a finite number of invocations of sends.

Let m be a message and consider an invocation of broadcast(m). This invocation can only cause the sending of messages of form (m,*, *). Thus, all we need to show is that every process eventually stops sending messages of this form.

Lemma 17 Let p be a correct process and q be a correct neighbor of p. If p forks task diffuse(m), then eventually condition q $got_p$(m) holds forever.

Proof. By Lemma 13 part (1), we only need to show that eventually q belongs to $got_p$(m). Suppose, by contradiction, that q never belongs to $got_p$(m). Let $(p_1,p_2, \ldots ,p_{k'})$ be a simple fair path from p to q with $p_1$=p and $p_{k'}$=q. Let $(p_{k'},p_{k'+1'}, \ldots ,p_l)$ be a simple fair path from q to p with $p_{k'}$=p. For $1 \leq i < k$, let pi=$p_1, p_2, \ldots ,p_i$). Note that for $1 \leq i < k$, process $p_i$ appears at most once in $p_i$.

We claim that for each j=1, . . . , k−1, there is a set $g_j$ containing $\{p_1,p_2, \ldots, p_j\}$ such that p, sends (m,$g_j$, $p_1$) to $p_{j+1}$ an infinite number of times. For j=k−1, this claim together with the Fairness property of send and receive immediately implies that $p_k$=p eventually receives (m,$g_{k-1}$, $p_{k-1}$).

Upon the receipt of such a message, p adds the contents of $g_{k-1}$ to its variable $got_p$(m). Since $g_{k-1}$ contains $p_{k'}$=q, this contradicts the fact that q never belongs to $got_p$(m).

We show the claim by induction on j. For the base case note that, since q never belongs to $got_p$(m) and q is a neighbor of $p_1$=p. then $p_1$ executes the loop in lines 11–16 an infinite number of times. Since q is a correct neighbor of $p_1$, the HB-Accuracy property guarantees that the heartbeat sequence of q at $p_1$ is nondecreasing and unbounded. Thus, the condition in line 13 evaluates to true an infinite number of times. So $p_1$ executes line 14 infinitely often. Since $p_2$ is a correct neighbor of $p_1$, its heartbeat sequence is nondecreasing and unbounded, and so $p_1$ sends a message of the form (m, *, $p_1$) to $p_2$ an infinite number of times. By Lemma 14, there is some $g_1$ such that $p_1$ sends (m,$g_1$, $p_1$) to $p_2$ an infinite number of times. Note that Lemma 13 parts (1) and (2) implies that $p_1 \in g_1$. This shows the base case.

For the induction step, suppose that for j<k−1, $p_j$ sends (m,$g_j$, $p_j$) to $p_{j+1}$ an infinite number of times, for some $g_j$ containing $\{p_1,p_2, \ldots ,p_j\}$. By the Fairness property of send and receive, $p_{j+1}$/receives (m,$g_j$, $p_1$) from $p_j$, an infinite number of times. Since $p_{j+2}$ is a neighbor of $p_{j+1}$ and appears at most once in $p_{j+1}$, each time $p_{j+1}$-receives (m,$g_j$, $p_1$), it sends a message of the form (m,$g_j$, $p_j$) to $p_{j+2}$. It is easy to see that each such message is (m, g, $p_{j+1}$) for some g that contains both $g_j$, and $p_{j+1}$. By Lemma 14, there exists $g_{j+1} \subseteq \Pi$ such that $g_{j+1}$ contains $(p_1,p_2, \ldots ,p_{j+1})$ and $p_{j+1}$ sends (m, $g_j$, $p_{j+1}$) to $p_{j+2}$ an infinite number of times.

Corollary 18 If a correct process p forks task diffuse(m), then eventually p stops sending messages in task diffuse(m).

Proof. For every neighbor q of p, there are two cases. If q is correct then eventually condition q $\in$ $got_p$(m) holds forever by Lemma 17. If q is faulty, then the HB-Completeness property guarantees that the heartbeat sequence of q at p is bounded, and so eventually condition prev__$hb_p$[q] $\geq$ $hb_p$[q] holds forever. Therefore, there is a time after which the guard in line 13 is always false. Hence, p eventually stops sending messages in task diffuse(m).

Lemma 19 If some process sends a message of the form (m, *,path), then no process appears more than twice in path.

Proof (Sketch). By line 25 of the algorithm, a process sends a message (m, g, path) to a process q only if q appears at most once in path. The result follows by an easy induction that uses this fact and the Integrity property of send and receive.

Lemma 20 (Quiescence) Eventually every process stops sending messages of the form (m, *, *).

Proof. Suppose for a contradiction that some process p never stops sending messages of the form (m, *, *). Note that p must be correct. By Lemma 19, the third component of a message of the form (m, *, *) ranges over a finite set of values. Therefore, for some path, p sends an infinite number of messages of the form (m, *,path). By Lemma 14, for some $g \subseteq \Pi$, p sends an infinite number of messages (m,g,path). So, for some process q, process p invokes $send_{p,q}$(m, g, path) an infinite number of times.

There are two cases. First, if path is empty we immediately. reach a contradiction since a send with empty path can occur neither in line 14 nor in line 26. For the second case, suppose that path consists of at least one process and let path=$(p_1, \ldots p_{k'})$ where k$\geq$1. Corollary 18 shows that there is a time after which p stops sending messages in its task diffuse(m). Since p only invokes send in task diffuse(m) or in line 26, then an infinite number of invocations of $send_{p,q}$(m, g, path) occurs at line 26. Each such invocation can occur only when p receives a message of the form (m, *,path) where path'=. . . ($p_1, \ldots ,p_{k-1}$). So p receives a message of the form (m, *,path') an infinite number of times. By the Integrity property of send and receive, there is an infinite number of sends of a message of this form top. By Lemma 14, for some g' $\subseteq \Pi$, there is an infinite number of sends (m, *,path') to p. Therefore, there exists a correct process p' such that $send_{p',p}$(m, g', path)) is invoked an infinite number of times. By repeating this argument k−1 more times we conclude that there exist $g^{(k)} \subseteq \Pi$, and correct processes $p^{(k)}$ and $p^{(k-1)}$ such that $send_p^{(k)}$ and $p^{(k-1)}$ (m, $g^{(k)}$, $path^{(k)}$) is invoked an infinite number of times, where $path^{(k)}$ is empty.

From Lemmata 11, 12, 16, and 20 we have:

Theorem 21 For the general network case, FIG. 4 is a quiescent implementation of reliable broadcast that uses HB.

From this theorem and Remark 1 we have:

Corollary 22 In the general network case, quasi reliable send and receive between every pair of processes can be implemented with a quiescent algorithm that uses HB.

9 Implementations of HB

We now give implementations of HB for the two types of communication networks that we considered in the previous sections. These implementations do not use timeouts.

9.1 The Simple Network Case

We assume all links in the network are bidirectional and fair (FIG. 1a). In this case, the implementation is obvious. Every process p executes two concurrent tasks (FIG. 5). In the first one, p periodically sends message HEARTBEAT to all its neighbors. The second task handles the receipt of HEARTBEAT messages. Upon the receipt of such a message from process q, p increases the heartbeat value of q.

We now prove that the implementation is correct.

Lemma 23 (HB-Completeness) At each correct process, the heartbeat sequence of every faulty neighbor is bounded.

Proof. Obvious.

Lemma 24 At each process p, the heartbeat sequence of every neighbor q is nondecreasing.

Proof. This is clear since $D_p[q]$ can only be changed in line 13.

Lemma 25 At each correct process p, the heartbeat sequence of every correct neighbor q is unbounded.

Proof. Since $q \in$ neighbor(p) and all links are bidirectional, we have $p \in$ neighbor(q). Moreover, since q is correct, its Task 1 executes forever. Therefore, q sends an infinite number of HEARTBEAT messages to p. By the Fairness property of send and receive, p receives an infinite number of HEARTBEAT messages from q. Every time p receives HEARTBEAT from q, it increments $D_p[q]$ in line 13. So, p increments $D_p[q]$ an infinite number of times. Moreover, by Lemma 24, $D_p[q]$ can never be decremented. So, the heartbeat sequence of q at p is unbounded.

Corollary 26 (HB-Accuracy) At each process the heartbeat sequence of every neighbor is nondecreasing, and at each correct process the heartbeat sequence of every correct neighbor is unbounded.

Proof. From Lemniata 24 and 25.

From Lemma 23 and the above corollary, we have:

Theorem 27 For the simple network case, FIG. 5 implements HB.

9.2 The General Network Case

In this case some links may be unidirectional and/or not fair (FIG. 1b). The implementation is more complex than before because HEARTBEAT has to be diffused, and this introduces the following problem: when a process p receives a HEARTBEAT message it has to relay it even if this is not the first time p receives such a message. This is because this message could be a new "heartbeat" from the originating process. But this could also be an "old" heartbeat that cycled around the network and came back, and p must avoid relaying such heartbeats.

The implementation is given in FIG. 6. Every process p executes two concurrent tasks. In the first task, p perodically sends message (HEARTBEAT,p) to all its neighbors. The second task handles the receipt of messages of the form (HEARTBEAT, path). Upon the receipt of such message from process q, p increases the heartbeat values of all its neighbors that appear in path. Then p appends itself to path and forwards message (HEARTBEAT, path) to all its neighbors that do not appear in path.

We now proceed to prove the correctness of the implementation.

Lemma 28 At every process p, the heartbeat sequence of every neighbor q is nondecreasing.

Proof. This is clear since $D_p[q]$ can only be changed in line 14.

Lemma 29 At each correct process, the heartbeat sequence of every correct neighbor is unbounded.

Proof. Let p be a correct process, and q be a correct neighbor of p. Let $P=(p_1, \ldots, p_k)$ be a simple fair path from q to p with $p_1=q$ and $p_k=p$. For $j=1, \ldots, k$, let $p_j=(p_1, \ldots, p_j)$. For each $j=1, \ldots, k-1$, we claim that $p_j$ sends (HEARTBEAT, $P_j$) to $p_{j+1}$, an infinite number of times. We show this by induction on j. For the base case (j=1), note that $p_1=q$ is correct, so its Task 1 executes forever and therefore $p_1$ sends (HEARTBEAT,$p_1$) to all its neighbors, and thus to $p_2$, an infinite number of times. For the induction step, let $j<k-1$ and assume that $p_j$ sends (HEARTBEAT, $p_j$) to an infinite number of times. Since $p_{j+1}$, is correct and the link $p_j \to p_{j+1}$ is fair, $p_{j+1}$ receives (HEARTBEAT, $p_j$) an infinite number of times. Moreover, $p_{j+2}$ does not appear in $p_{j+1}$, and $p_{j+2}$ is a neighbor of $p_{j+1}$, so each time $p_{j+1}$ receives (HEARTBEAT, $p_j$), it sends (HEARTBEAT, $p_{j+1}$) to $p_{j+2}$ in line 17. Therefore, $p_{j+1}$ sends (HEARTBEAT, $p_{j+1}$) to $p_{j+2}$ an infinite number of times. This shows the claim.

For j=k–1 this claim shows that $p_{k-1}$ sends (HEARTBEAT, $p_{k-1}$) to $p_k$ an infinite number of times. Process $p_k$ is correct and link $p_{k-1} \to p_k$ is fair, so $p_k$ receives (HEARTBEAT, $p_{k-1}$) an infinite number of times. Note that $q \in$ neighbor($p_k$) (since $p_k=p$) and $q \in p_{k-1}$ (since $p_1=q$). So every time $p_k$ receives (HEARTBEAT, $p_{k-1}$), it increments $D_p[q]$ in line 14. So $D_p[q]$ is incremented an infinite number of times. Note that, by Lemma 28, $D_p[q]$ can never be decremented. So, the heartbeat sequence of q at $p_k=p$ is unbounded.

Corollary 30 (HB-Accuracy) At each process the heartbeat sequence of every neighbor is nondecreasing, and at each correct process the heartbeat sequence of every correct neighbor is unbounded.

Proof. From Lemmata 28 and 29.

Lemma 31 If some process p sends (HEARTBEAT,path) then (1) p is the last process in path and (2) no process appears twice in path.

Proof (Sketch). This follows from lines 9, 15 and 16, and a simple induction that uses the Integrity property of send and receive.

Lemma 32 Let p, q be processes, and path be a non-empty sequence of processes. If p receives message (HEARTBEAT,path . q) an infinite number of times, then q receives message (HEARTBEAT,path) an infinite number of times.

Proof. Let M be the message (HEARTBEAT, path . q) and let $M_0$ be the message (HEARTBEAT,path). Suppose p receives M an infinite number of times. By the Integrity property of send and receive, some process p' sends M to p an infinite number of times. By Lemma 31 part (1), we have q=p'. Since the length of path q is at least two, q can only send M in line 17. So q only sends M if it receives $M_0$. Therefore q receives $M_0$ an infinite number of times.

Lemma 33 (HB-Completeness) At each correct process, the heartbeat sequence of every faulty neighbor is bounded.

Proof (Sketch). Let p be a correct process and let q be a faulty neighbor of p. Suppose that the heartbeat sequence of q at p is not bounded. Then p increments $D_p[q]$ an infinite number of times. So, for an infinite number of times, p receives messages of the form (HEARTBEAT, *) with a second component that contains q. By Lemma 31 part (2), the second component of a message of the form (HEARTBEAT, *) ranges over a finite set of values. Thus there exists a path containing q such that p receives (HEARTBEAT, path) an infinite number of times.

Let path=$(p_1, \ldots, p_k)$. Then, for some $j \leq k$, $p_j=q$. If j=k then, by the Integrity property of send and receive and by Lemma 31 part (1), q sends (HEARTBEAT, path) to p an infinite number of times. This contradicts the fact that q is faulty. If $j \leq k$ then, by repeated applications of Lemma 32, we conclude that $p_{j+1}$ receives message (HEARTBEAT, $p_1, \ldots, p_j$) an infinite number of times. Therefore, by the Integrity property of send and receive and Lemma 31 part (1), $p_j$ sends (HEARTBEAT, $p_1, \ldots, p_j$) to $p_{j+1}$ an infinite number of times. Since $p_j=q$, this contradicts the fact that q is faulty.

By Corollary 30 and the above lemma, we have:

Theorem 34 For the general network case, FIG. 6 implements HB.

10 Stronger Communication Primitives

Quasi reliable send and receive and reliable broadcast are sufficient to solve many problems (see Section 11.1). However, stronger types of communication primitives, namely, reliable send and receive, and uniform reliable broadcast, are sometimes needed. We now give quiescent implementations of these primitives for systems with process crashes and message losses.

Let t be the number of processes that may crash. [BCBT96] shows that if $t \geq n/2$ (i.e., half of the processes may crash) these primitives cannot be implemented, even if we assume that links may lose only a finite number of messages and we do not require that the implementation be quiescent.

We now show that if $t<n/2$ then there are quiescent implementations of these primitives for the two types of network considered in this paper. The implementations that we give here are simple and modular but highly inefficient. More efficient ones can be obtained by modifying the algorithms in FIGS. 3 and 4. Hereafter, we assume that $t<n/2$.

10.1 Reliable Send and Receive

If a process s returns from the invocation of $send_3,r$ (m) we say that s completes the sending of message m to r. With quasi reliable send and receive, it is possible that s completes the sending of m to r, then s crashes, and r never receives m (even though it does not crash). In contrast, with reliable send and receive primitives, if s completes the sending of message m to a correct process r then r eventually receives m (even if s crashes). More precisely, reliable send and receive satisfy Integrity (Section 4.2) and:

No Loss: For all $k \geq 1$, if r is correct and s completes the sending of m to r exactly k times, then r receives m from s at least k times.[11] The No Loss and Quasi No loss properties are very similar to the Strong Validity and Validity properties in Section 6 of [HT94].

Reliable send and receive primitives are denoted R-SEND/R-RECEIVE. As before, SEND/RECEIVE denote the quasi reliable primitives.

FIG. 7 shows a quiescent implementation of R-SEND and R-RECEIVE (the code consisting of lines 7 and 8 is executed atomically). It uses reliable broadcast and SEND/RECEIVE between every pair of processes. We have already shown that these primitives have quiescent implementations using HB for the two types of network in consideration.

Roughly speaking, when s wishes to R-SEND m to r, it broadcasts a message that contains m, s, r and a fresh sequence number, and then waits to RECEIVE t+1 acknowledgements for that message before returning from this invocation of R-SEND. When a process p delivers this broadcast message, it SENDs an acknowledgement back to s, and if p=r then it also R-RECEIVEs m from s. The proof of correctness is straightforward and thus omitted.

10.2 Uniform Reliable Broadcast

The Agreement property of reliable broadcast states that if a correct process delivers a message m, then all correct processes eventually deliver m. This requirement allows a faulty process (i.e. one that subsequently crashes) to deliver a message that is never delivered by the correct processes. This behavior is undesirable in some applications, such as atomic commitment in distributed databases [Gra78, Had86, BT93]. For such applications, a stronger version of reliable broadcast is more suitable, namely, uniform reliable broadcast which satisfies Uniform Integrity, Validity (Section 5.2) and:

Uniform Agreement [NT90]: If any process delivers a message m, then all correct processes eventually deliver m.

FIG. 8 shows a quiescent implementation of uniform reliable broadcast which uses reliable broadcast and SEND/RECEIVE between every pair of processes. The proof of correctness is straightforward and thus omitted.

11 Using HB to Extend Previous Work

HB can be used to extend previous work in order to solve problems with algorithms that are both quiescent and tolerant of process crashes and messages losses.

11.1 Extending Existing Algorithms to Tolerate Link Failures

HB can be used to transform many existing algorithms that tolerate process crashes into quiescent algorithms that tolerate both process crashes and message losses. For example, consider the randomized consensus algorithms of [Ben83, Rab83, CMS89, FM90], the failure-detector based ones of [CT96, AT96], the probabilistic one of [BT85], and the algorithms for atomic broadcast in [CT96], k-set agreement in [Cha93], atomic commitment in [Gue95], and approximate agreement in [DLP+86]. These algorithms tolerate process crashes, and they use quasi reliable send and receive, and/or reliable broadcast, as their sole communication primitives. All of these algorithms can be made to tolerate both process crashes and message losses (with fair links) in two simple steps: (1) implement HB as described in Section 9, and (2) plug in the quiescent communication primitives given in Section 8.[12] Similar steps can be applied to algorithms that use reliable send/receive or uniform reliable broadcast, provide a majority of processes are correct, by plugging in the implementations in Section 10. The resulting algorithms tolerate message losses and are quiescent.

11.2 Extending Results of [BCBT96]

Another way to solve problems with quiescent algorithms that tolerate both process crashes and message losses is obtained by extending the results of [BCBT96]. That work addresses the following question: given a problem that can be solved in a system where the only possible failures are process crashes, is the problem still solvable if links can also fail by losing messages? One of the models of lossy links considered in [BCBT96] is called fair lossy. Roughly speaking, a fair lossy link p→q satisfies the following property: If p sends an infinite number of messages to q and q is correct, then q receives an infinite number of messages from p. Fair lossy and fair links differ in a subtle way. For instance, if process p sends the sequence of distinct messages $m_1, m_2, m_3, \ldots$ to q and p→q is fair lossy, then q is guaranteed to receive an infinite subsequence, whereas if p→q is fair, q may receive nothing (because each distinct message is sent only once). On the other hand, if p sends the sequence $m_1, m_2, m_1, m_2, \ldots$ and p→q is fair lossy, q may never receive a copy of $m_2$ (while it receives $m_1$ infinitely often), whereas if p→q is fair, q is guaranteed to receive an infinite number of copies of both $m_1$ and $m_2$.[13] In [BCBT96], message piggybacking is used to overcome message losses. To avoid this piggybacking, in this paper we adopted the model of fair links: message losses can now be overcome by separately sending each message repeatedly.

[BCBT96] establishes the following result: any problem P that can be solved in systems with process crashes can also be solved in systems with process crashes and fair lossy links, provided P is correct-restricted[14] Intuitively, a problem P is correct-restricted if its specification does not refer to the behavior of faulty processes [Gop92, BN92]. or a majority of processes are correct. For each of these two cases, [BCBT96] shows how to transform any algorithm that solves P in a system with process crashes, into one that solves P in a system with process crashes and fair lossy links. The algorithms that result from these transformations, however, are not quiescent: each transformation requires processes to repeatedly send messages forever.

Given HB, we can modify the transformations in [BCBT96] to ensure that if the original algorithm is quiescent then so is the transformed one. Roughly speaking, the modification consists of (1) adding message acknowledgements; (2) suppressing the sending of a message from p to q if either (a) p has received an acknowledgement for that message from q, or (b) the heartbeat of q has not increased since the last time p sent a message to q; and (3) modifying the meaning of the operation "append $Queue_1$ to $Queue_2$" so that only the elements in $Queue_1$ that are not in $Queue_2$ are actually appended to $Queue_2$. The results in [BCBT96], combined with the above modification, show that if a problem P can be solved with a quiescent algorithm in a system with crash failures only, and either P is correct-restricted or a majority of processes are correct, then P is solvable with a quiescent algorithm that uses HB a system with crash failures and fair lossy links.

12 Generalization to Networks That Partition

In this paper, we assumed that every pair of correct processes are reachable from each other through fair paths. In [ACT97b], we drop this assumption and consider the more general problem of quiescent reliable communication in networks that may partition. In particular, we (a) generalize the definitions of quasi reliable send and receive and of reliable broadcast, (b) generalize the definition of the heartbeat failure detector and implement it in networks that may partition, and (c) show that this failure detector can be used to achieve quiescent reliable communication in such networks. In [ACT97b] we also consider the problem of consensus for networks that may partition, and we use HB to solve this problem with a quiescent protocol (we also use a generalization of the Eventually Strong failure detector [CT96]).

13 Quiescence Versus Termination

In this paper we considered communication protocols that tolerate process crashes and message losses, and focused on achieving quiescence. What about achieving termination? A terminating protocol guarantees that every process eventually reaches a halting state from which it cannot take further actions. A terminating protocol is obviously quiescent, but the converse is not necessarily true. For example, consider the protocol described at the beginning of Section 1. In this protocol, (a) s sends a copy of m repeatedly until it receives ack(m) from r, and then it halts; and (b) upon each receipt of m, r sends ack(m) back to s. In the absence of process crashes this protocol is quiescent. However, the protocol is not terminating because r never halts: r remains (forever) ready to reply to the receipt of a possible message from s. Can we use HB to obtain reliable communication protocols that are terminating? The answer is no, even for systems with no process crashes. This follows from the result in [KT88] which shows that in a system with message losses (fair links) and no process crashes there is no terminating protocol that guarantees knowledge gain.

Acknowledgments

We are grateful to Anindya Basu and Vassos Hadzilacos for having provided extensive comments that improved the presentation of this paper. We would also like to thank Tushar Deepak Chandra for suggesting the name Heartbeat.

References

[ACT97a] Marcos Kawazoe Aguilera, Wei Chen, and Sam Toueg. On the weakest failure detector to achieve quiescence. Manuscript, April 1997.

[ACT97b] Marcos Kawazoe Aguilera, Wei Chen, and Sam Toueg. Quiescent reliable communication and quiescent consensus in partitionable networks. Technical Report 97-1632, Department of Computer Science, Cornell University, June 1997.

[AT96] Marcos Kawazoe Aguilera and Sam Toueg. Randomization and failure detection: a hybrid approach to solve consensus. In *Proceedings of the 10th International Workshop on Distributed Algorithms*, Lecture Notes on Computer Science, pages 29–39. Springer-Verlag, October 1996.

[BCBT96] Anindya Basu, Bernadette Charron-Bost, and Sam Toueg. Simulating reliable links with unreliable links in the presence of process crashes. In *Proceedings of the 10th International Workshop on Distributed Algorithms*, Lecture Notes on Computer Science, pages 105–122. Springer-Verlag, October 1996.

[BDM97] Ö zalp Babaoglu, Renzo Davoli, and Alberto Montresor. Partitionable group membership: specification and algorithms. Technical Report UBLCS-97-1, Dept. of Computer Science, University of Bologna, Bologna, Italy, January 1997.

[Ben83] Michael Ben-Or. Another advantage of free choice: Completely asynchronous agreement protocols. In *Proceedings of the 2nd ACM Symposium on Principles of Distributed Computing*, pages 27–30, August 1983.

[BN92] R. Bazzi and G. Neiger. Simulating crash failures with many faulty processors. In A. Segal and S. Zaks, editors, *Proceedings of the 6th International Workshop on Distributed Algorithms*, volume 647 of *Lecture Notes on Computer Science*, pages 166–184. Springer-Verlag, 1992.

[BT85] Gabriel Bracha and Sam Toueg. Asynchronous consensus and broadcast protocols. *Journal of the ACM*, 32(4):824–840, October 1985.

8 BT93] Ö zalp Babaoglu and Sam Toueg. Non-blocking atomic commitment. In Sape J. Mullender, editor, *Distributed Systems*, chapter 6. Addison-Wesley, 1993.

[Cha93] Soma Chaudhuri. More choices allow more faults: Set consensus problems in totally asynchronous systems. *Information and Computation*, 105(1):132–158, July 1993.

[Cha97] Tushar Deepak Chandra, April 1997. Private Communication.

[CHT96] Tushar Deepak Chandra, Vassos Hadzilacos, and Sam Toueg. The weakest failure detector for solving consensus. *Journal of the ACM*, 43(4):685–722, July 1996.

[CMS 89] Benny Chor, Michael Merritt, and David B. Shmoys. Simple constant-time consensus protocols in realistic failure models. *Journal of the ACM*, 36(3): 591–614, 1989.

[CT961 Tushar Deepaic Chandra and Sam Toueg. Unreliable failure detectors for reliable distributed systems. *Journal of the ACM*, 43(2):225–267, March 1996.

[DFKM96] Danny Dolev, R y Friedman, Idit Keidar, and Dahlia Malkhi. Failure detectors in omission failure environments. Technical Report 96-1608, Department of Computer Science, Cornell University, Ithaca, New York, 1996.

[DLP+86] Danny Dolev, Nancy A. Lynch, Shlomit S. Pinter, Eugene W. Stark, and William E. Weihl. Reaching approximate agreement in the presence of faults. *Journal of the ACM*, 33(3):499–516, July 1986.

[FLP85] Michael J. Fischer, Nancy A. Lynch, and Michael S. Paterson. Impossibility of distributed consensus with one faulty process. *Journal of the ACM*, 32(2):374–382, April 1985.

(FM90) Paul Feldman and Silvio Micali. An optimal algorithm for synchronous Byzantine agreement. Technical Report MLT/LCS/TM-425, Laboratory for Computer Science, Massachusetts Institute of Technology, June 1990.

[GLS95] Rachid Guerraoui, Michael Larrea, and André Schiper. Non blocking atomic commitment with an unreliable failure detector. In *Proceedings of the 14th IEEE Symposium on Reliable Distributed Systems*, pages 13–15, 1995.

[Gop92] Ajei Gopal. *Fault-Tolerant Broadcasts and Multicasts: The Problem of Inconsistency and Contamination*. PhD thesis, Cornell University, January 1992.

[Gra78] James N. Gray. Notes on database operating systems. In R. Bayer, R. M. Graham, and G. Seegmuller, editors, *Operating Systems: An Advanced Course, volume 66 of Lecture Notes on Computer Science*. Springer-Verlag, 1978. Also appears as IBM Research Laboratory Technical report R12188.

[Gue95] Rachid Guerraoui. Revisiting the relationship between non-blocking atomic commitment and consensus. In *Proceedings of the 9th International Workshop on Distributed Algorithms*, pages 87–100, Le Mont-St-Michel, France, 1995. Springer Verlag, LNCS 972.

[Had86] Vassos Hadzilacos. On the relationship between the atomic commitment and consensus problems. In *Proceedings of the Workshop on Fault-Tolerant Distributed Computing*, volume 448 of *Lecture Notes on Computer Science*, pages 201–208. Springer-Verlag, March 1986.

[HT94] Vassos Hadzilacos and Sam Toueg. A modular approach to fault-tolerant broadcasts and related problems. Technical Report 94-1425, Department of Computer Science, Cornell University, Ithaca, N.Y., May 1994.

[KT88] Richard Koo and Sam Toueg. Effects of message loss on the termination of distributed protocols. *Information Processing Letters*, 27(4):181–188, April 1988.

[LH94] Wai-Kau Lo and Vassos Hadzilacos. Using failure detectors to solve consensus in asynchronous shared-memory systems. In *Proceedings of the 8th International Workshop on Distributed Algorithms*, pages 280–295, Terschelling, The Netherlands, 1994.

[Lyn96] Nancy A. Lynch. *Distributed Algorithms*. Morgan Kaufmann Publishers, Inc., 1996.

[NT90] Gil Neiger and Sam Toueg. Automatically increasing the fault-tolerance of distributed algorithms. *Journal of Algorithms*, 1 1(3):374–419, 1990.

[Rab83] Michael Rabin. Randomized Byzantine generals. In *Proceedings of the 24th Symposium on Foundations of Computer Science*, pages 403–409. IEEE Computer Society Press, November 1983.

[SM95] Laura S. Sabel and Keith Marzullo. Election vs. consensus in asynchronous systems. Technical Report 95-1488, Department of Computer Science, Cornell University, Ithaca, N.Y., Febrary 1995.

[vR97] Robbert van Renesse, April 1997. Private Communication.

1 Introduction

We consider partitionable networks with process crashes and lossy links, and focus on the problems of reliable communication and consensus for such networks. For both problems we seek algorithms that are quiescent, i.e., algorithms that eventually stop sending messages.

This paper consists of two parts. In the first part, we show how to achieve quiescent reliable communication over partitionable networks by extending the results for non-partitionable networks described in [ACT97a]. In the second part, we show how to achieve quiescent consensus for partitionable networks by using the results of the first part. We now describe the type of partitionable networks that we consider and then describe our results in greater detail.

Research partially supported by NSF grant CCR-9402896, by ARPA/ONR grant N00014-96-1-1014, and by an Olin Fellowship.

We consider asynchronous networks with process crashes and lossy links. We assume that a lossy link is either fair or eventually down. Roughly speaking, a fair link may lose an infinite number of messages, but if a message is repeatedly sent then it is eventually received. A link is eventually down (we also say that it eventually crashes) if it eventually stops transporting messages. Links are unidirectional and the network is not necessarily completely connected. The network is partitionable: there may be two correct processes p and q such that q is not reachable from p, i.e., there is no fair path from p to q. A fair path is one consisting of correct processes and fair links. A partition is a maximal set of processes that are mutually reachable from each other. We do not assume that partitions are eventually isolated: one partition may be able to receive messages from another, or to successfully send messages to another partition, forever.

An example of a network that partitions is given in FIG. 1. The processes that do not crash (black disks) are eventually divided into four partitions, A, B, C and D. Each partition is strongly connected through fair links (solid arrows). So processes in each partition can communicate with each other (but message losses can occur infinitely often). None of the partitions are isolated. For example, processes in D may receive messages from processes in C and are able to send messages to processes in B. There is no fair path from C to A, or from D to C, etc.

Quiescent Reliable Communication

[ACT97a] shows that without the help of failure detectors it is impossible to achieve quiescent reliable communication in the presence of process crashes and lossy links—even if one assumes that the network never partitions. In order to overcome this problem, [ACT97a] introduces the heartbeat failure detector (denoted HB), and shows how it can be implemented, and how it can be used to achieve quiescent reliable communication. All these results are for networks that do not partition.

In this paper, we extend the above results to partitionable networks. In particular, we: (a) generalize the definitions of reliable communication primitives, (b) generalize the definition of the heartbeat failure detector HB, (c) show how to implement HB, (d) use HB to achieve quiescent reliable communication.

Quiescent Consensus

We also consider the problem of consensus for partitionable networks, and focus on solving this problem with a quiescent algorithm. In order to do so, we first generalize the traditional definition of consensus to partitionable networks. We also generalize the definition of $\diamond S$—the weakest failure detector for solving consensus in networks that do not partition [CHT96b].

We first show that, although $\diamond S$ can be used to solve consensus for partitionable networks, any such solution is not quiescent: Thus, $\diamond S$ alone is not sufficient to solve quiescent consensus for partitionable networks. We then show that this problem can be solved using $\diamond S$ together with HB. In fact, our quiescent consensus algorithm for partitionable networks is identical to the one given in [CT96] for non-partitionable networks with reliable links: we simply replace the communication primitives used by the algorithm in [CT96] with the quiescent reliable communication primitives that we derive in the first part of this paper (the proof of correctness, however, is different).

The first paper to consider the consensus problem for partitionable networks is [FKM+95]. Algorithms for this problem problem are given in [CHT96a, DFKM96]. These algorithms also use a variant of $\diamond S$ but in contrast to the algorithm given in this paper they are not quiescent (and do not use HB).

Organization of the Paper

The rest of the paper is organized as follows. In Section 2, we explain our model of partitionable networks, and of failure detection for such networks. In Section 3, we extend the definition of the failure detector HB to partitionable networks. In Section 4, we define reliable communication primitives for partitionable networks, and give quiescent implementations that use HB. We then turn our attention to the consensus problem in Section 5. We first define this problem for partitionable networks (Section 5.1), and extend the definition of the failure detector $\diamond S$ (Section 5.2). We then show that $\diamond S$ is not sufficient to achieve quiescent consensus in partitionable networks (Section 5.3), and give a quiescent implementation that uses both $\diamond S$ and HB (Section 5.4). In Section 6, we show how to implement HB in partitionable networks. We conclude with a brief discussion of related work (Section 7) and of our model (Section 8).

2 Model

We consider asynchronous message-passing distributed systems in which there are no timing assumptions. In particular, we make no assumptions on the time it takes to deliver a message, or on relative process speeds. Processes can communicate with each other by sending messages through unidirectional links. The system can experience both process failures and link failures. Processes can fail by crashing, and links can fail by crashing, or by intermittently dropping messages (while remaining fair). Failures may cause permanent network partitions. The detailed model, based on those in [CHT96b, ACT97a], is described next.

A network is a directed graph $G=(\Pi,E)$ where $\Pi=\{1,\ldots,n\}$ is the set of processes, and $E \subseteq \Pi \times \Pi$ is the set of links. If there is a link from process p to process q, we denote this linky by $p \to q$, and if, in addition, $q \neq p$ we say that q is a neighbor of p is denoted by neighbor(p).

We assume the existence of a discrete global clock—this is merely a fictional device to simplify the presentation and processes do not have access to it. We take the range T of the clock's ticks to be the set of natural numbers.

2.1 Failures and Failure Patterns

Processes can fail by crashing, i.e., by halting prematurely. A process failure pattern Fp is a function from T to $2^\pi$. Intuitively, Fp(t) denotes the set of processes that have crashed through time t. Once a process crashes, it does not "recover", i.e., $\forall t: Fp(t) \subseteq Fp(t+1)$. We define crashed(Fp)= $\cup_{t \in T} Fp(t)$ and correct(Fp)=$\Pi \setminus$ crashed(Fp). If $p \in$ crashed (Fp) we say p crashes (or is faulty) in Fp and if $p \in$ correct(Fp) we say p is correct in Fp.

We assume that the network has two types of links: links that are fair and links that crash. Roughly speaking, a fair link $p \to q$ may intermittently drop messages, and do so infinitely often, but if p repeatedly sends some message to q and q does not crash, then q eventually receives that message. If link $p \to q$ crashes, then it eventually stops transporting messages. Link properties are made precise in Section 2.5.

A link failure patter $F_L$ is a function from T to $2^{\wedge}$. Intuitively, $F_L(t)$ is the set of links that have crashed through time t. Once a link crashes, it does not "recover", i.e., $\forall t: F_L(t) \subseteq F_L(t+1)$. We define crashed $(F_L)=\cup_{t \in T} F_L(t)$. If $p \to q \in$ crashed $(F_L)$, we say that $p \to q$ crashes (or is eventually down) in $F_L$. If $p \to q \notin$ crashed $(F_L)$, we say that $p \to q$ is fair in $F_L$.

A failure patter $F=(F_P, F_L)$ combines a process failure pattern and a link failure pattern.

2.2 Connectivity

In contrast to [ACT97a], the network is partitionable: there may be two correct processes p and q such that q is not reachable from p (FIG. 1). Intuitively, a partition is a maximal set of processes that are mutually reachable from each other. We do not assume that partitions are eventually isolated: one partition may be able to receive messages from another, or to successfully send messages to another partition, forever. This is made more precise below.

The following definitions are with respect to a given failure pattern $F=(F_P, F_L)$. We say that a path $(p_1, \ldots, p_k)$ in the network is fair if processes $p_1, \ldots, p_k$, are correct and links $p_1 \to p_2, \ldots, P_{k-1} \to P_k$ are fair. We say process q is reachable from process p if there is a fair path from p to q.[2] We allow singleton paths of the form (p). Since fair paths contain only correct processes, p is reachable from itself in and only fit is correct. If p and q are both reachable from each other, we write $p \square_F q$. Note that $\square_F$ is an equivalence relation on the set of correct processes. The equivalence classes are called partitions. The partition of a process p (with respect to F) is denoted partition $_F(p)$. For convenience, if p is faulty we define partition $_F(P)=\emptyset$. The set of all non-empty partitions is denoted by Partitions $_F$. The subscript F in the above definitions is omitted whenever it is clear from the context.

2.3 Failure Detectors

Each process has access to a local failure detector module that provides (possibly incorrect) information about the failure pattern that occurs in an execution. A failure detector history H with range R is a function from Π×T to R. H(p, t) is the output value of the failure detector module of process p at time t. A failure detector D is a function that maps each failure pattern F to a set of failure detector histories with range $R_D$ (where $R_D$ denotes the range of the failure detector output of D). D(F) denotes the set of possible failure detector histories permitted by D for the failure pattern F.

2.4 Algorithms and Runs

An algorithm A is a collection of n deterministic automata, one for each process in the system. As in [FLP85], computation proceeds in atomic steps of A. In each step, a process (1) attempts to receive a message from some process, (2) queries its failure detector module, (3) undergoes a state transition according to A, and (4) may send a message to a neighbor.

A run of algorithm A using failure detector D is a tuple R=(F, $H_D$, I, S, T) where F=($F_P$,$F_L$) is a failure pattern, $H_D$, ∈ D(F) is a history of failure detector D for failure pattern F, I is an initial configuration of A, S is an infinite sequence of steps, and T is an infinite list of strictly increasing time values indicating when each step in S occurs.

A run must satisfy some properties for every process p: If p has crashed by time t, i.e., p ∈ Fp(t), then p does not take a step at any time t'≧t; if p is correct, i.e., p ∈ correct(Fp), then p takes an infinite number of steps; if p takes a step at time 1 and queries its failure detector, then p gets $H_D$ (P, t) as a response.

The correctness of an algorithm may depend on certain assumptions on the "environment", e.g., the maximum number of processes and/or links that may crash. For example, in Section 5.4, we give a consensus algorithm that assumes that a majority of processes are in the same network partition. Formally, an environment ∈ is a set of failure patterns.

A problem P is defined by properties that sets of runs must satisfy. An algorithm A solves problem P using a failure detector D in environment ∈ if the set of all runs R=(F, $H_D$, I, S, T) of A using D where F ∈ E satisfies the properties required by P. Let C be a class of failure detectors. An algorithm A solves a problem P using C in environment E if for all D ∈ C, A solves P using D in E. An algorithm implements C in environment E if it implements some D ∈ C in E. Unless otherwise stated, we put no restrictions on the environment (i.e., E is the set of all possible failure patterns) and we do not refer to it.

2.5 Link Properties

So far we have put no restrictions on how links behave in a run (e.g., processes may receive messages that were never sent, etc.). As we mentioned before, we want to model networks that have two types of links: links that are fair and links that crash. We therefore require that in each run R=(F, $H_D$, I, S, T) the following properties hold for every link p→q ∈^:

[Integrity] ∀k≧1, if q receives a message m from p exactly k times by time t, then p sent m to q at least k times before time t;

If p→q ∉ crashed(FL): [Fairness] if p sends a message m to q an infinite number of times and q is correct, then q receives m from p an infinite number of times.

If p→q ∉ crashed(FL): [Finite Receipt] q receives messages from p only a finite number of times.

Integrity ensures that a link does not create or duplicate messages. Fairness ensures that if a link does not crash then it eventually transports any message that is repeatedly sent through it. Finite Receipt implies that if a link crashes then it eventually stops transporting messages.

3 The Heartbeat Failure Detector HB for Partitionable Networks

One of our goals is to achieve quiescent reliable communication in partitionable networks with process crashes and message losses. In [ACT97a] it is shown that without failure detectors this is impossible, even if one assumes that the network does not partition. In order to circumvent this impossibility result, [ACT97a] introduces the heartbeat failure detector, denoted HB, for non-partitionable networks. In this section, we generalize the definition of HB to partitionable networks. We then show how to implement it in Section 6.

Our heartbeat failure detector HB is different from the ones defined in [CT96], or those currently in use in many systems (even though some existing systems, such as Ensemble and Phoenix, use the same name heartbeat in their failure detector implementations [vR97, Cha97]). In contrast to existing failure detectors, HB is implementable without the use of timeouts (see Section 6). Moreover, as explained below, HB outputs a vector of counters rather than a list of suspected processes. In [ACT97b] we show that this is a fundamental difference.

A heartbeat failure detector D (for partitionable networks) has the following features. The output of D at each process p is an array ($v_1$, $v_2$, ... ,vn) with one nonnegative integer for each process in Π. Intuitively, $v_q$ increases if process q is in the partition of p, and stops increasing otherwise. We say that $v_q$ is the heartbeat value of process q at p. The heartbeat sequence of q at p is the sequence of the heartbeat values of q at p as time increases. D satisfies the following properties:

HB-Completeness: At each correct process p, the heartbeat sequence of every process not in the partition of p is bounded. Formally:
∀F=($F_P$, $F_L$) ∀H ∈ D(F), ∀p ∈ correct ($F_P$) ∀q ∈ Π\partition $_F$(P),
∃K ∈ N∀t ∈T. H(p,t)[q]≦K We could have required a stronger property: if p→q has crashed by time t, i.e., p→q ∈ $F_L$ (t), then q does not receive any message sent by p at time t'≧t. This stronger property is not necessary in this paper.

In [ACr97a], the output of D at p is an array with one nonnegative integer for each neighbor of p.

At each process p, the heartbeat sequence of every process is nondecreasing. Formally:
∀F ∀H ∈ D(F), ∀p ∈ Π ∀q ∈ T: H(p,t)[q]≦H(p,t+1)[q]

At each correct process p, the heartbeat sequence of every process in the partition of p is unbounded. Formally:
∀F=($F_P$, $F_L$) ∀H ∈ D(F), ∀p ∈ correct ($F_P$) ∀q ∈ partition $_F$(p),
∀K ∈ N ∃ t ∈ T: H(p,t)[q]≦K The class of all heartbeat failure detectors is denoted HB. By a slight abuse of notation, we sometimes use HB to denote a (generic) member of that class.

4 Reliable Communication for Partitionable Networks

There are two types of basic communication primitives: point-to-point and broadcast. We first define reliable versions of these primitives, and then give quiescent implementations that use HB for partitionable networks. Our definitions generalize those for non-partitionable networks given in [ACT97a].

4.1 Quasi Reliable Send and Receive for Partitionable Networks

Consider any two distinct processes s and r. We define quasi reliable send and receive from s to r (for partitionable networks) in terms of two primitives: qr-send$_{s,r}$ and qr-receive$_{r,s}$. We say that process s qr-sends message m to process r if s invokes qr-send$_{s,r}$(m). We assume that if s is correct, it eventually returns from this invocation. We allow process s to qr-send the same message m more than once through the same link. We say that process r qr-receives message m from process s if r returns from the invocation of qr-receiver$_{r,s}$(m). Primitives qr-send$_{s,r}$ and qr-receiver$_{r,s}$ satisfy the following properties:

Quasi No Loss: For all k≧1, if s and r are in the same partition, and s qr-sends m to r exactly k times, then r qr-receives m from s at least k times.

Integrity: For all k>1, if r qr-receives m from s exactly k times, then s previously qr-sent m to r at least k times.

Partition Integrity: If r qr-receives messages from s an infinite number of times then r is reachable from s.

Quasi No Loss together with Integrity implies that for all k≧0 if s and r are in the same partition and s sends m to r exactly k times, then r receives m from s exactly k times.

We want to implement qr-send$_{s,r}$ and qr-receive$_{r,s}$ using the communication service provided by the network links (which are described in Section 2.5). Informally, such an implementation is quiescent if a finite number of invocations of qr-send$_{s,r}$ cause the sending of only a finite number of messages throughout the network.

4.2 Reliable Broadcast for Partitionable Networks

Reliable broadcast (for partitionable networks) is defined in terms of two primitives: broadcast(m) and deliver(m). We say that process p broadcasts message m if p invokes broadcast(m). We assume that every broadcast message m includes the following fields: the identity of its sender, denoted sender(m), and a sequence number, denoted seq(m). These fields make every message unique. We say that q delivers message m if q returns from the invocation of deliver(m). Primitives broadcast and deliver satisfy the following properties:

Validity: If a correct process broadcasts a message m, then it eventually delivers m.

Agreement: If a correct process p delivers a message m, then all processes in the partition of p eventually deliver m.

Uniform Integrity: For every message m, every process delivers m at most once, and only if m was previously broadcast by sender(m).

Partition Integrity: If a process q delivers an infinite number of messages broadcast by a process p, then q is reachable from p.

We want to implement broadcast and deliver using the communication service provided by the network links. Informally, such an implementation is quiescent if a finite number of invocations of broadcast cause the sending of only a finite number of messages throughout the network.

4.3 Quiescent Reliable Communication Using HB.

We now give a quiescent implementation of reliable broadcast for partitionable networks—with this, one can easily obtain a quiescent implementation of quasi reliable send and receive for every pair of processes. The implementation of reliable broadcast is identical to the one given in [ACT97aI for non-partitionable networks. However, the network assumptions, the reliable broadcast requirements, and the failure detector properties are different, and so its proof of correctness and quiescence changes.

The reliable broadcast algorithm has the following desirable feature: processes do not need to know the entire network topology or the number of processes in the system; they only need to know the identity of their neighbors. Moreover, each process only needs to know the heartbeats of its neighbors.

The implementation of reliable broadcast is shown in FIG. 2. $D_p$ denotes the current output of the failure detector D at process p. All variables are local to each process. In the following, when ambiguities may arise, a variable local to process p is subscripted by p. For each message m that is broadcast, each process p maintains a variable got$_p$(m) containing a set of processes. Intuitively, a process q is in got$_p$(m) if p has evidence that q has delivered m.

In order to broadcast a message m, p first delivers m; then p initializes variable got$_p$(m) to {p} and forks task diffuse (m); finally p returns from the invocation of broadcast(m). The task diffuse(m) runs in the background. In this task, p periodically checks if, for some neighbor q∉got$_p$(m). the heartbeat of q at p has increased and, if so, p sends a message containing m to all neighbors whose heartbeat increased—even to those who are already in got$_p$(m). The task terminates when all neighbors of p are contained in got$_p$(m).

It may appear that p does not need to send this message to processes in got$_p$(m), since they already got it! The reader should verify that this optimization" would make the algorithm fail.

All messages sent by the algorithm are of the form (m, got_msg, path) where got_msg is a set of processes and path is a sequence of processes. Upon the receipt of such a message, process p first checks if it has already delivered m and, if not, it delivers m and forks task diffuse(m). Then p adds the contents of got_msg to got$_p$(m) and appends itself to path. Finally, p forwards the new message (m, got_msg, path) to all its neighbors that appear at most once in path.

The code consisting of lines 18–26 is executed atomically. Moreover, if there are several concurrent executions of the diffuse task (lines 9 to 16), then each execution must have its own private copy of all the local variables in this task, namely m, hb, and prev_hb.

We now show that this implementation is correct and quiescent. The proofs of the first few lemmata are obvious and therefore omitted.

Lemma 1 (Uniform Integrity) For every message m, every process delivers in at most once, and only if m was previously broadcast by sender(m).

Lemma 2 (Validity) If a correct process broadcasts a message m, then it eventually delivers m.

Lemma 3 (Partition Integrity) If a process q delivers an infinite number of messages broadcast by a process p, then q is reachable from p.

Lemma 4 For any processes p and q, (1) if at some time t, q ∈ got$_p$(m), then at every time t'≧2 t, q ∈ got$_p$(m); (2) When got$_p$(m) is initialized, p ∈ got$_p$(m); (3) if q ∈ got$_p$(m) then q delivered m.

Lemma 5 For every m and path, there is a finite number of distinct messages of the form (m, *,path).

Lemma 6 Suppose link p→q is fair, and p and q are in the same partition. If p delivers a message m, then q eventually delivers m.

Proof. Suppose for a contradiction that p delivers m and q never delivers m. Since p and q are in the same partition, they are both correct. Therefore, p forks task diffuse (m). Since q does not deliver m, by Lemma 4 part (3) q never belongs to $got_p(m)$. Because p is correct and q is a neighbor of p, this implies that p executes the loop in lines 11–16 an infinite number of times. Since q is in the partition of p, the HB-Accuracy property guarantees that the heartbeat sequence of q at p is nondecreasing and unbounded. Thus, the condition in line 13 evaluates to true an infinite number of times. Therefore, p executes line 14 infinitely often. So p sends a message of the form (m, *,p) to q infinitely often. By Lemma 5, there exists a subset $g_0 \subseteq \Pi$ such that p sends message (m, $g_0$,p) infinitely often to q. Since q is correct and link p→q is fair, q eventually receives (m, $g_0$, p). Therefore, q delivers m, a contradiction.

Lemma 7 (Agreement) If a correct process p delivers a message m, then all processes in the partition of p eventually deliver m.

Proof (Sketch). For every process q in the partition of p, there is a fair path from p to q. The result follows from successive applications of Lemma 6 over the links of this path.

We now show that the implementation in FIG. 2 is quiescent. In order to do so, we focus on a single invocation of broadcast and show that it causes the sending of only a finite number of messages in the network. This implies that a finite number of invocations of broadcast cause the sending of only a finite number of messages.

Let m be a message and consider an invocation of broadcast(m). This invocation can only cause the sending of messages of form (m, *, *). Thus, all we need to show is that every process eventually stops sending messages of this form.

Lemma 8 Let p be a process and q be a neighbor of p with $q \in$ partition (p). If p forks task diffuse(m), then eventually condition $q \in got_p(m)$ holds forever.

Proof. By Lemma 4 part (1), we only need to show that eventually q belongs to $got_p(m)$. Suppose, for a contradiction, that q never belongs to $got_p(m)$. Since p and q are in the same partition, they are correct and there exist both a simple fair path $(p_1,p_2, \ldots ,p_{k'})$ from p to q with $p_1=p$ and $p_{k'}=q$, and a simple fair path $(p_{k'},p_{k'+1}, \ldots ,p_k)$ from q to p with $p_k=p$. For $1 \leq j \leq k$, let $P_j=(p_1,p_2, \ldots ,p_j)$. Note that for $1 \leq j < k$ process $p_{j+1}$ appears at most once in Pj. Moreover, for every j=1, ...., k, $p_j \in$ partition (p).

We claim that for each j=1, ... ,k−1, there is a set $g_j$ containing $\{p_1,p_2, \ldots ,p_j\}$ such that p, sends (m, $g_j$,$P_j$) to $p_{j+1}$ an infinite number of times. For j=k−1, this claim together with the Fairness property of link $p_{k-1} \rightarrow p_k$ immediately implies that $p_k=p$ eventually receives (m,$g_{k-1}$,$P_{k-1}$). Upon the receipt of such a message, p adds the contents of $g_{k'-1}$ to its variable $got_p(m)$. Since $g_{k'-1}$ contains $p_{k'}=q$, this contradicts the fact that q never belongs to $got_p(m)$.

We show the claim by induction on j. For the base case, note that q never belongs to $got_p(m)$ and q is a neighbor of $p_1=p$, and so $p_1$ executes the loop in lines 11–16 an infinite number of times. Furthermore, since q is in the partition of $p_1=p$ the HB-Accuracy property guarantees that the heartbeat sequence of q at $p_1$ is nondecreasing and unbounded. This implies that the condition in line 13 evaluates to true an infinite number of times. So $p_1$1 executes line 14 infinitely often. Since $p_2$ is in the partition of $p_1$, its heartbeat sequence is nondecreasing and unbounded. Together with the fact that $p_2$ is a neighbor of $p_1$, this implies that $p_1$ sends a message of the form (m, *, $p_1$) to $p_2$ an infinite number of times. By Lemma 5, there is some $g_1$ such that $p_1$ sends (m, $g_1$, $p_1$) to $p_2$ an infinite number of times. Parts (1) and (2) of Lemma 4 imply that $p_1 \in g_1$. This shows the base case.

For the induction step, suppose that for j<k−1, $p_j$ sends (m, $g_j$, $p_j$), to $p_{j+1}$, an infinite number of times, for some set $g_j$ containing $\{p_1,p_2, \ldots ,p_j\}$. By the Fairness property of the link $p_j \rightarrow p_{j+1}$, $p_{j+1}$ receives (m, $g_j$, $p_j$) from $p_j$, an infinite number of times. Since $p_{j+2}$ is a neighbor of $p_{j+1}$ and appears at most once in $p_{j+1}$ each time $p_{j+1}$ receives (m, $g_j$, $p_j$), it sends a message of the form (m,*, $p_{j+1}$) to $p_{j+2}$. It is easy to see that each such message is (m,*, $p_{j+1}$) for some g that contains both $g_j$, and $\{p_{j+1}\}$. By Lemma 5, there exists $g_{j+1} \subseteq \Pi$ such that $g_{j+1}$ contains $\{p_1,p_2, \ldots ,p_{j+1}\}$ and $p_{j+1}$ sends (m, $g_{j+1}p_{j+1}$) to $p_{j+2}$ an infinite number of times.

Corollary 9 If a correct process p forks task diffuse(m), then eventually p stops sending messages in task diffuse(m).

Proof. For every neighbor q of p, there are two cases. If q is in the partition of p then eventually condition $q \in got_p(m)$ holds forever by Lemma 8. If q is not in the partition of p, then the HB-Completeness property guarantees that the heartbeat sequence of q at p is bounded, and so eventually condition prev_$hb_p[q] \geq hb_p[q]$ holds forever. Therefore, there is a time after which the guard in line 13 is always false. Hence, p eventually stops sending messages in task diffuse(m).

Lemma 10 If some process sends a message of the form (m, *,path), then no process appears more than twice in path.

Proof. Obvious.

Lemma 11 (Quiescence) Eventually every process stops sending messages of the form (m, *, *).

Proof. Suppose for a contradiction that some process p never stops sending messages of the form (m, *, *). Note that p must be correct. By Lemma 10, the third component of a message of the form (m, *, *) ranges over a finite set of values. Therefore, for some path, p sends an infinite number of messages of the form (m, *, path). By Lemma 5, for some $g \subseteq \Pi$, p sends an infinite number of messages (m, g, path). So, for some process q, process p sends (m, g, path) to q an infinite number of times.

There are two cases. First, if path is empty, we immediately reach a contradiction since a send with the empty path can occur neither in line 14 nor in line 26. For the second case, suppose that path consists of at least one process and let path=$(p_1, \ldots p_k)$, where $k \geq 1$. Corollary 9 shows that there is a time after which p stops sending messages in its task diffuse(m). Since p only sends a message in task diffuse(m)

This is where the proof uses the fact that p sends a message containing m to all its neighbors whose heartbeat increased—even to those (such as $p_2$) that may already be in $got_p(m)$ (cf. line 14 of the algorithm). or in line 26, then p sends (m, g, path) to q in line 26 an infinite number of times. Such a send can occur only when p receives a message of the form (m, *, path') where path'=$(p_1, \ldots ,p_{k-1})$ So p receives a message of the form (m, *, path') an infinite number of times. The Integrity property of the links implies that some process p' sends a message of that form to p an infinite number of times. By Lemma 5, for some $g' \subseteq \Pi$ p' sends (m, g', path') to p an infinite number of times. By repeating this argument k−1 more times we conclude that there exist $g^{(k)} \subseteq \Pi$ and correct processes $p^{(k)}$ and $p^{(k-1)}$ such that $p^{(k)}$ sends (m, $g^{(k)}$, path$^{(k)}$) to $p^{(k-1)}$ an infinite number of times, where path$^{(k)}$ is empty. This reduces the second case to the first case.

From Lemmata 1, 2, 3, 7, and 11 we have:

Theorem 12 For partitionable networks, FIG. 2 shows a quiescent implementation of reliable broadcast that uses HB.

Given any quiescent implementation of reliable broadcast, we can obtain a quiescent implementation of the quasi reliable primitives qr-send$_{p,q}$ and qr-receive$_{q,p}$ for every pair of processes p and q. The implementation works as follows: to qr-send a message m to q, p simply broadcasts the message M=(m, p, q, k) using the given quiescent implementation of reliable broadcast, where sender(M)=p and seq(M)=k, a sequence number that p has not used before. Upon the delivery of M (m, p, q, k), a process r qr-receives m from p if r=q, and discards in otherwise. This implementation of qr-send$_{p,q}$ and qr-receive$_{q,p}$ is clearly correct and quiescent.

Thus, we have:

Corollary 13 For partitionable networks, quasi reliable send and receive between every pair of processes can be implemented with a quiescent algorithm that uses HB.

4 Reliable Communication for Partitionable Networks

There are two types of basic communication primitives: point-to-point and broadcast. We first define reliable versions of these primitives, and then give quiescent implementations that use HB for partitionable networks. Our definitions generalize those for non-partitionable networks given in [ACT97a].

4.1 Quasi Reliable Send and Receive for Partitionable Networks

Consider any two distinct processes s and r. We define quasi reliable send and receive from s to r (for partitionable networks) in terms of two primitives: qr-send$_{s,r}$ and qr-receive$_{r,s}$. We say that process s qr-sends message m to process r if s invokes qr-send$_{s,r}$(m). We assume that if s is correct, it eventually returns from this invocation. We allow process s to qr-send the same message m more than once through the same link. We say that process r qr-receives message m from process s if r returns from the invocation of qr-receiver$_{r,s}$(m). Primitives qr-send$_{s,r}$ and qr-receiver$_{s,r}$ satisfy the following properties:

Quasi No Loss: For all k≧1, if s and r are in the same partition, and s qr-sends m to r exactly k times, then r qr-receives m from s at least k times.

Integrity: For all k≧I, if r qr-receives m from s exactly k times, then s previously qr-sent m to r at least k times.

Partition Integrity: If r qr-receives messages from s an infinite number of times then r is reachable from s.

Quasi No Loss together with Integrity implies that for all k≧0 if s and r are in the same partition and s sends m to r exactly k times, then r receives m from s exactly k times.

We want to implement qr-send$_{s,r}$ and qr-receive$_{r,s}$ using the communication service provided by the network links (which are described in Section 2.5). Informally, such an implementation is quiescent if a finite number of invocations of qr-sends,r,. cause the sending of only a finite number of messages throughout the network.

4.2 Reliable Broadcast for Partitionable Networks

Reliable broadcast (for partitionable networks) is defined in terms of two primitives: broadcast(m) and deliver(m). We say that process p broadcasts message m if p invokes broadcast(m). We assume that every broadcast message m includes the following fields: the identity of its sender, denoted sender(m), and a sequence number, denoted seq(m). These fields make every message unique. We say that q delivers message m if q returns from the invocation of deliver(m). Primitives broadcast and deliver satisfy the following properties:

Validity: If a correct process broadcasts a message m, then it eventually delivers m.

Agreement: If a correct process p delivers a message m, then all processes in the partition of p eventually deliver m.

Uniform Integrity: For every message m, every process delivers m at most once, and only if m was previously broadcast by sender(m).

Partition Integrity: If a process q delivers an infinite number of messages broadcast by a process p, then q is reachable from p.

We want to implement broadcast and deliver using the communication service provided by the network links. Informally, such an implementation is quiescent if a finite number of invocations of broadcast cause the sending of only a finite number of messages throughout the network.

4.3 Quiescent Reliable Communication Using HB

We now give a quiescent implementation of reliable broadcast for partitionable networks—with this, one can easily obtain a quiescent implementation of quasi reliable send and receive for every pair of processes. The implementation of reliable broadcast is identical to the one given in [ACT97a] for non-partitionable networks. However, the network assumptions, the reliable broadcast requirements, and the failure detector properties are different, and so its proof of correctness and quiescence changes.

The reliable broadcast algorithm has the following desirable feature: processes do not need to know the entire network topology or the number of processes in the system; they only need to know the identity of their neighbors. Moreover, each process only needs to know the heartbeats of its neighbors.

The implementation of reliable broadcast is shown in FIG. 2. D$_p$, denotes the current output of the failure detector D at process p. All variables are local to each process. In the following, when ambiguities may arise, a variable local to process p is subscripted by p. For each message m that is broadcast, each process p maintains a variable got$_p$(m) containing a set of processes. Intuitively, a process q is in got$_p$(m) if p has evidence that q has delivered m.

In order to broadcast a message m, p first delivers m; then p initializes variable got$_p$(m) to {p} and forks task diffuse (m); finally p returns from the invocation of broadcast(m). The task diffuse(m) runs in the background. In this task, p periodically checks if, for some neighbor q ∈ got$_p$(m), the heartbeat of q at p has increased and, if so, p sends a message containing m to all neighbors whose heartbeat increased—even to those who are already in got$_p$(m). The task terminates when all neighbors of p are contained in got$_p$(m).

It may appear that p does not need to send this message to processes in got$_p$(m), since they already got it! The reader should verify that this "optimization" would make the algorithm fail.

All messages sent by the algorithm are of the form (m, got_msg, path) where got_msg is a set of processes and path is a sequence of processes. Upon the receipt of such a message, process p first checks if it has already delivered m and, if not, it delivers m and forks task diffuse(m). Then p adds the contents of got_msg to got$_p$(m) and appends itself to path. Finally, p forwards the new message (m, got_msg, path) to all its neighbors that appear at most once in path.

The code consisting of lines 18–26 is executed atomically. Moreover, if there are several concurrent executions of the diffuse task (lines 9 to 16), then each execution must have its own private copy of all the local variables in this task, namely m, hb, and prev_hb.

We now show that this implementation is correct and quiescent. The proofs of the first few lemmata are obvious and therefore omitted.

Lemma 1 (Uniform Integrity) For every message m, every process delivers in at most once, and only if m was previously broadcast by sender(m).

Lemma 2 (Validity) If a correct process broadcasts a message m, then it eventually delivers m.

Lemma 3 (Partition Integrity) If a process q delivers an infinite number of messages broadcast by a process p, then q is reachable from p.

Lemma 4 For any processes p and q, (1) if at some time t, $q \in got_p(m)$, then at every time $t' \geq t$, $q \in got_p(m)$; (2) When $got_p(m)$ is initialized, $p \in got_p(m)$; (3) if $q \in got_p(m)$ then q delivered m.

Lemma 5 For every m and path, there is a finite number of distinct messages of the form (m, *,path).

Lemma 6 Suppose link p→q is fair, and p and q are in the same partition. If p delivers a message m, then q eventually delivers m.

Proof. Suppose for a contradiction that p delivers m and q never delivers m. Since p and q are in the same partition, they are both correct. Therefore, p forks task diffuse (m). Since q does not deliver m, by Lemma 4 part (3) q never belongs to $got_p(m)$. Because p is correct and q is a neighbor of p, this implies that p executes the loop in lines 11–16 an infinite number of times. Since q is in the partition of p,. the HB-Accuracy property guarantees that the heartbeat sequence of q at p is nondecreasing and unbounded. Thus, the condition in line 13 evaluates to true an infinite number of times. Therefore, p executes line 14 infinitely often. So p sends a message of the form (m, *,p) to q infinitely often. By Lemma 5, there exists a subset $g_0 \subseteq \Pi$ such that p sends message $(m, g_0, p)$ infinitely often to q. Since q is correct and links q is fair, q eventually receives $(m, g_0, p)$. Therefore, q delivers m, a contradiction.

Lemma 7 (Agreement) If a correct process p delivers a message m, then all processes in the partition of p eventually deliver m.

Proof (Sketch). For every process q in the partition of p, there is a fair path from p to q. The result follows from successive applications of Lemma 6 over the links of this path.

We now show that the implementation in FIG. 2 is quiescent. In order to do so, we focus on a single invocation of broadcast and show that it causes the sending of only a finite number of messages in the network. This implies that a finite number of invocations of broadcast cause the sending of only a finite number of messages.

Let m be a message and consider an invocation of broadcast(m). This invocation can only cause the sending of messages of form (m, *, *). Thus, all we need to show is that every process eventually stops sending messages of this form.

Lemma 8 Let p be a process and q be a neighbor of p with $q \in$ partition (p). If p forks task diffuse(m), then eventually condition $q \in got_p(m)$ holds forever.

Proof. By Lemma 4 part (1), we only need to show that eventually q belongs to $got_p(m)$. Suppose, for a contradiction, that q never belongs to $got_p(m)$. Since p and q are in the same partition, they are correct and there exist both a simple fair path $(p_1, p_2, \ldots, p_{k'})$ from p to q with $p_1$=p and $p_{k'}$=q, and a simple fair path $(p_{k'}, p_{k'+1}, \ldots, p_k)$ from q to p with $p_k$=p. For $1 \leq j \leq k$, let $p_j$=$(p_1, p_2, \ldots, p_j)$. Note that for $1 \leq j < k$, process $p_{j+1}$ appears at most once in $p_j$,. Moreover, for every j=1, . . . ,k, pj $\in$ partition (p).

We claim that for each j=1, . . . , k-1, there is a set $g_j$ containing $\{p_1, p_2, \ldots, p_j\}$ such that p, sends $(m, g_j p_j)$ to $p_{j+1}$ an infinite number of times. For j=k-1, this claim together with the Fairness property of link $p_{k-1} \to p_k$ immediately implies that $p_k$=p eventually receives $(m, g_{k-1} \to p_{k-1})$. Upon the receipt of such a message, p adds the contents of $g_{k-1}$ to its variable $got_p(m)$. Since $g_{k-1}$ contains $p_{k'}$=q, this contradicts the fact that q never belongs to $got_p(m)$.

We show the claim by induction on j. For the base case, note that q never belongs to $got_p(m)$ and q is a neighbor of $p_1$=p, and so $p_j$ executes the loop in lines 11–16 an infinite number of times. Furthermore, since q is in the partition of p, the HB-Accuracy property guarantees that the heartbeat sequence of q at $p_1$ is nondecreasing and unbounded. This implies that the condition in line 13 evaluates to true an infinite number of times. So $p_1$ executes line 14 infinitely often. Since $p_2$ is in the partition of $p_1$, its heartbeat sequence is nondecreasing and unbounded. Together with the fact that $p_2$ is a neighbor of $p_1$, this implies that $p_1$ sends a message of the form (m,*, $p_1$) to $p_2$ an infinite number of times. By Lemma 5, there is some $g_1$ such that $p_1$ sends $(m, g_1, p_1)$ to $p_2$ an infinite number of times. Parts (1) and (2) of Lemma 4 imply that $p_1 \in g_1$. This shows the base case.

For the induction step, suppose that for j<k-1, $p_j$ sends $(m, g_j, p_j)$ to $p_{j+1}$ an infinite number of times, for some set $g_j$ containing $\{p_1, p_2, \ldots, p_j\}$. By the Fairness property of the link $p_j \to p_{j+1}$, $p_{j+1}$ receives $(m, g_j, p_j)$ from $p_j$ an infinite number of times. Since $p_{j+2}$ is a neighbor of $p_{j+1}$ and appears at most once in $p_{j+1}$, each time $p_{j+1}$ receives $(m, g_j, p)$, it sends a message of the form $(m,*, p_{j+1})$ to $p_{j+2}$. It is easy to see that each such message is $(m, g, p_{j+1})$ for some g that contains both $g_j$, and $\{p_{j+1}\}$. By Lemma 5, there exists $g_{j+1} \subseteq \Pi$ such that $g_{j+1}$ contains $\{p_1, p_2, \ldots, p_j\}$ and $p_{j+1}$ sends $(m, g_{j+1}, p_{j+1})$ to $p_{j+1}$ an infinite number of times.

Corollary 9 If a correct process p forks task diffuse(m), then eventually p stops sending messages in task diffuse(m).

Proof. For every neighbor q of p, there are two cases. If q is in the partition of p then eventually condition $q \in got_p(m)$ holds forever by Lemma 8. If q is not in the partition of p, then the HB-Completeness property guarantees that the heartbeat sequence of q at p is bounded, and so eventually condition prev_$hb_p[q] \geq hb_p[q]$ holds forever. Therefore, there is a time after which the guard in line 13 is always false. Hence, p eventually stops sending messages in task diffuse(m).

Lemma 10 If some process sends a message of the form (m, *,path), then no process appears more than twice in path.

Proof. Obvious.

Lemma 11 (Quiescence) Eventually every process stops sending messages of the form (m,*, *).

Proof. Suppose for a contradiction that some process p never stops sending messages of the form (m, *, *). Note that p must be correct. By Lemma 10, the third component of a message of the form (m, *, *) ranges over a finite set of values. Therefore, for some path, p sends an infinite number of messages of the form ((m, *, path). By Lemma 5, for some $g \subseteq \Pi$, p sends an infinite number of messages ((m,g, path). So, for some process q, process p sends ((m,g, path) to q an infinite number of times.

There are two cases. First, if path is empty, we immediately reach a contradiction since a send with the empty path can occur neither in line 14 nor in line 26. For the second case, suppose that path consists of at least one process and let path=$(p_1, \ldots, p_k)$, where $k \geq 1$. Corollary 9 shows that there is a time after which p stops sending messages in its task diffuse(m). Since p only sends a message in task diffuse (m) or in line 26, then p sends (m, g, path) to q in line 26 an infinite number of times. Such a send can occur only when p receives a message of the form (m, *, path') where path'=$(p_1, \ldots, p_{k-1})$. So p receives a message of the form (m, *, path) an infinite number of times. The Integrity property of the links implies that some process p' sends a message of that form to p an infinite number of times. By Lemma 5, for some $g' \subseteq \Pi$ p' sends (m, g' path') to p an infinite number of times. By repeating this argument k-I more times we conclude that there exist $g^{(k)} \subseteq \Pi$ and correct processes $p^{(k)}$ and $p^{(k-1)}$ such that $p^{(k)}$ sends $(m,g^{(k)}, \text{path}^{(k-1)}$ to $p^{(k-1)}$ an infinite number of times, where $\text{path}^{(k)}$ is empty. This reduces the second case to the first case.

From Lemmata 1, 2, 3, 7, and 11 we have:

Theorem 12 For partitionable networks, FIG. 2 shows a quiescent implementation of reliable broadcast that uses HB.

Given any quiescent implementation of reliable broadcast, we can obtain a quiescent implementation of the quasi reliable primitives qr-send$_{p,q}$ and qr-receive$_{q,p}$ for every pair of processes p and q. The implementation works as follows: to qr-send a message in to q, p simply broadcasts the message M=(m, p, q, k) using the given quiescent implementation of reliable broadcast, where sender(M)=p and seq(M)=k, a sequence number that p has not used before. Upon the delivery of M=(m,p,q, k), a process r qr-receives m from p if r=q, and discards m otherwise. This implementation of qr-send$_{p,q}$ and qr-receive$_{q,p}$ is clearly correct and quiescent. Thus, we have:

Corollary 13 For partitionable networks, quasi reliable send and receive between every pair of processes can be implemented with a quiescent algorithm that uses HB. This is where the proof uses the fact that p sends a message containing m to all its neighbors whose heartbeat increased—even to those (such as p2) that may already be in got~(ml (cf line 14 of the algorithm).

5 Consensus for Partitionable Networks

5.1 Specification

We now define the problem of consensus for partitionable networks as a generalization of the standard definition for non-partitionable networks. Roughly speaking, some processes propose a value and must decide on one of the proposed values [FLP85]. More precisely, consensus is defined in terms of two primitives, propose(v) and decide(v), where v is a value drawn from a set of possible proposed values. When a process invokes propose(v), we say that it proposes v. When a process returns from the invocation of decide(v), we say that it decides v.

The largest partition is defined to be the one with the largest number of processes (if more than one such partition exists, pick the one containing the process with the largest process id). The consensus problem (for partitionable networks) is specified as follows:

Agreement: No two processes in the same partition decide differently.
Uniform Validity: A process can only decide a value that was previously proposed by some process.
Uniform Integrity: Every process decides at most once.
Termination: If all processes in the largest partition propose a value, then they all eventually decide.

Stronger versions of consensus may also require one or both of the following properties:

Uniform Agreement: No two processes (whether in the same partition or not) decide differently.
Partition Termination: If a process decides then every process in its partition decides.

The consensus algorithm given in Section 5.4 satisfies the above two properties, while the impossibility result in Section 5.3 holds for the weaker version of consensus.

Informally, an implementation of consensus is quiescent if each execution of consensus causes the sending of only a finite number of messages throughout the network. This should hold even for executions where only a subset of the correct processes actually propose a value (the others may not wish to run consensus).

5.2 ◇S for Partitionable Networks

It is well known that consensus cannot be solved in asynchronous systems, even if at most one process may crash and the network is completely connected with reliable links [FLP85]. To overcome this problem, Chandra and Toueg introduced unreliable failure detectors in [CT96]. In this paper, we focus on the class of eventually strong failure detectors (the weakest one for solving consensus in non-partitionable networks [CHT96b]), and extend it to partitionable networks. The other classes of eventual failure detectors introduced in [CT96] can be generalized in a similar way.

At each process p, an eventually strong failure detector outputs a set of processes. In [CT96], these are the processes that p suspects to have crashed. In our case, these are the processes that p suspects to be outside its partition. More precisely, an eventually strong failure detectorD (for partitionable networks) satisfies the following properties (in the following, we say that a process p trusts process q, if its failure detector does not suspects q):

Strong Completeness: For every partition P. there is a time after which every process that is not in P is permanently suspected by every process in P. Formally:
$\forall F, \forall H \in D(F), \forall P \in \text{Partitions}_F, \exists t \in T, \forall p \notin P, \forall q \in P, \forall t' \geq t: p \in H(q,t')$ Eventual Weak Accuracy: For every partition P, there is a time after which some process in P is permanently trusted by every process in P. Formally:
$\forall F, \forall H \in D(F), \forall P \in \text{Partitions}_F \exists t \in T, \exists p \in P, \forall t' \geq t, \forall q \in P: p \notin H(q,t')$ The class of all failure detectors that satisfy the above two properties is denoted ◇S.

A weaker class of failure detectors, denoted ◇$S_{LP}$, is obtained by defining the largest partition as in Section 5.1, and replacing "For every partition P" with "For the largest partition P" in the two properties above (this definition is similar to one given in [DFKM96]).

By a slight abuse of notation, we sometimes use ◇S and ◇$S_{LP}$ to refer to an arbitrary member of the respective class.

5.3 Quiescent Consensus for Partitionable Networks Cannot Be Achieved Using ◇S Although consensus for partitionable networks can be solved using ◇S, we now show that any such solution is not quiescent (the consensus algorithms in [CHT96a, DFKM96] do not contradict this result because they are not quiescent).

Theorem 14 In partitionable networks with S or more processes, consensus has no quiescent implementation using C'S. This holds even if we assume that no process crashes, there is a link between every pair of processes, each link is eventually up or down, a majority of processes are in the same partition, and all processes initially propose a value.

I.e., for each link there is a time after which either all the messages sent are received or no message sent is received.

Proof (Sketch). The proof is by contradiction. Suppose there is a quiescent algorithm A that uses $\Diamond S$ to solve consensus for partitionable networks. We consider a network with $n \geq 5$ processes, and construct three runs of A using $\Diamond S$ in this network, such that the last run violates the specification of consensus. In each of these three runs no process crashes, and every process executes A by initially proposing 0.

Run $R_0$. There are two permanent partitions: $\{1, 2\}$ and $\{3, 4, \ldots, n\}$. Within each partition no messages are lost, and all messages sent across the partitions are lost. At all times, each process $p \in \{1, 2\}$ trusts only itself and process 2, and each process $p \in \{3, 4, \ldots, n\}$ trusts only itself and process 3. We can easily show that processes 1 and 2 cannot decide any value in this run. Since A is quiescent, there is a time $t_0$ after which no messages are sent or received in $R_0$. In a minority partition that does not receive messages from the outside, such as partition $\{1,2\}$ above, processes can never decide. Otherwise, we construct another run in which, after they decide, the minority partition merges with a majority partition where processes have decided differently.

Run $R_1$. Up to time $t_0$, R1 is identical to run $R_0$. At time $t_0+1$, the network partitions permanently into $\{1\}$ and $\{2, 3, \ldots, n\}$. From this time on, within each partition no messages are lost, and all messages sent across partitions are lost. Moreover, from time $t_0+1$, process 1 trusts only itself, and each process $p \in \{2, 3, \ldots, n\}$ trusts only itself and process 2. Since A is quiescent, there is a time $t_1$ after which no messages are sent or received in $R_1$.

Run $R_2$. There is a single partition: $\{1, 2, \ldots, n\}$. Throughout the whole run, process 1 and its failure detector module behaves as in $R_0$, and all other processes and their failure detector modules behave as in $R_1$. In particular, up to time $t_0$, $R_2$ is identical to $R_0$, and from time $t_0+1$ to $t_1$, all messages sent to and from process 1 are lost. We conclude that, as in $R_0$, process 1 does not decide in $R_2$. This violates the Termination property of consensus, since all processes in partition $\{1,2,\ldots,n\}$ propose a value.

Note that the behavior of the failure detector in each of the above three runs is compatible with $\Diamond S$.

5.4 Quiescent Consensus for Partitionable Networks using $\Diamond S_{LP}$ and HB.

To solve consensus using $\Diamond S_{LP}$ and HB in partitionable networks, we take the rotating coordinator consensus algorithm of [CT96], we replace its communication primitives with the corresponding ones defined in Sections 4.1 and 4.2, namely, qr-send, qr-receive, broadcast and deliver, and then we plug in the quiescent implementations of these primitives given in Section 4.3 (these implementations use HB). The resulting algorithm satisfies all the properties of consensus for partitionable networks, including Uniform Agreement and Partition Termination, under the assumption that the largest partition contains a majority of processes (this assumption is only necessary for the Termination property of consensus). Moreover, this algorithm is quiescent. A standard partitioning argument shows that consensus for partitionable networks cannot be solved using $\Diamond S$ and HB if we do not make this assumption.

Although this algorithm is almost identical to the one given in [CT96] for non-partitionable networks, the network assumptions, the consensus requirements, and the failure detector properties are different, and so its proof of correctness and quiescence changes.

The rotating coordinator algorithm is shown in FIG. 3 (the code consisting of lines 39–41 is executed atomically). Processes proceed in asynchronous "rounds". During round r, the coordinator is process $c=(r \bmod n)+1$. Each round is divided into four asynchronous phases. In Phase 1, every process qr-sends its current estimate of the decision value timestamped with the round number in which it adopted this estimate, to the current coordinator c. In Phase 2, c waits to qr-receive $\lceil (n+1)/2 \rceil$ such estimates, selects one with the largest timestamp, and qr-sends it to all the processes as its new estimate $estimate_c$. In Phase 3, for each process p there are two possibilities: (1) p qr-receives estimated from c, it adopts $estimate_c$ as its own estimate, and then qr-sends an ack to c; or (2) upon consulting its failure detector module, p suspects c, and qr-sends a nack to c. In Phase 4, c waits to qr-receive $\lceil (n+1)/2 \rceil$ replies (ack or nack). If all replies are acks, then c knows that a majority of processes changed their estimates to $estimate_c$, and thus $estimate_c$ is locked (i.e., no other decision value is possible). Consequently, c reliably broadcasts a request to decide $estimate_c$. At any time, if a process delivers such a request, it decides accordingly.

We next prove that the algorithm is correct and quiescent. Our proof is similar to the one in [CT96], except for the proofs of Termination and Quiescence. The main difficulty in these proofs stems from the fact that we do not assume that partitions are eventually isolated: it is possible for processes in one partition to receive messages from outside this partition, forever. The following is an example of why this is problematic. The failure detector $\Diamond S_{LP}$ guarantees that in the largest partition there is some process c that is trusted by all processes in that partition. However, c may be permanently suspected of being faulty by processes outside the largest partition. Thus, it is conceivable that c receives nacks from these processes in Phase 4 of every round in which it acts as the coordinator. These nacks would prevent c from ever broadcasting a request to decide. In such a scenario, processes in the largest partition never decide, and they qr-send messages forever. Similar scenarios in which processes in the minority partitions qr-send messages forever are also conceivable. To show that all such undesirable scenarios cannot occur, we use a partial order on the set of partitions.

Lemma 15 (Uniform Integrity) Every process decides at most once.

Proof. Immediate from the algorithm.

Lemma 16 (Uniform Validity) A process can only decide a value that was previously proposed by some process.

Proof. Immediate from the algorithm, the Integrity property of qr-send and qr-receive and the Uniform Integrity property of reliable broadcast.

Lemma 17 (Partition Termination) If a process decides then every process in its partition decides.

A standard partitioning argument shows that consensus for partitionable networks cannot be solved using OS and 7U3 if we do not make this assumption.

Proof. If p is faulty then partition $(p)=\emptyset$ the result is vacuously true. If p is correct then the result follows from the Agreement property of reliable broadcast. We omit the proof of the next lemma because it is almost identical to the one of Lemma 6.2.1 in [CT96].

Lemma 18 (Uniform Agreement) No two processes (whether in the same partition or not) decide differently.

Lemma 19 Every process p invokes a finite number of broadcasts.

Proof (Sketch). If p crashes, the result is obvious. If p is correct and broadcasts at least once, it eventually delivers its first broadcast, and then stops broadcasting soon after this delivery.

For any partition P, we say that QuiescentDecision(P) holds if:

1. all processes in P eventually stop qr-sending messages, and
2. if $|P|>\lfloor n/2 \rfloor$ and all processes in P propose a value, then all processes in P eventually decide.

Lemma 20 For every partition P, if there is a time after which no process in P qr-receives messages from processes in $\Pi\backslash P$, then QuiescentDecision(P) holds.

Proof (Sketch). Let $t_0$ be the time after which no process in P qr-receives messages from processes in $\Pi\backslash P$. We first show that all processes in P eventually stop qr-sending messages. There are several possible cases.

Case 1: Some process in P decides. Then by Lemma 17 all processes in P decide. A process that decides stops qr-sending messages after it reaches the end of its current round, so all processes in P eventually stop qr-sending messages.

Case 2: No process in P decides. There are now two subcases:

Case 2.1: Each process in P that proposes a value blocks at a wait statement. Then all processes in P eventually stop qr-sending messages.

Case 2.2: Some process p in P that proposes a value does not block at any of the wait statements. Then, since p does not decide, it starts every round r>0. There are now two subcases:

Case 2.2.1: $|P| \leq \lfloor n/2 \rfloor$. Let $r_0$ be the round of process p at time $t_0$ and let $r_1$ be the first round after $r_0$ in which p is the coordinator. In Phase 2 of round $r_1$, p waits to qr-receive estimates from $\lceil (n+1)/2 \rceil$ processes. It can only qr-receive messages from processes in P, and since $|P| \leq \lfloor n/2 \rfloor$, it blocks at the wait statement of Phase 2—a contradiction.

Case 2.2.2: $|P|>\lfloor n/2 \rfloor$. By the Eventual Weak Accuracy property of $\Diamond S_{LP}$, there exists a process $c \in P$ and a time $t_1$ such that after $t_1$, all processes in P trust c. Let $t_2 = \max\{t_0, t_1\}$ and let $r_0$ be the largest round number among all processes at time $t_2$. Let $r_1$ and $r_2$ be, respectively, the first and second rounds greater than $r_0$ in which c is the designated coordinator. Since p trusts c after time $t_2$, and it completes Phase 3 of round $r_2$, p must have qr-received a message of the form $(c, r_2, \text{estimated}_c)$ from c in that phase. Therefore, c starts round $r_2$, and thus c completes round $r_1$. So c qr-receives messages from $\lceil (n+1)/2 \rceil$ processes in Phase 4 of round $r_1$. These processes are all in P because, after time $t_2$, c qr-receives no messages from processes in $\Pi\backslash P$. All such messages are ack's because all processes in P start round $r_1$ after time $t_2$, and so they trust c while in round $r_1$. Therefore, c reliably broadcasts a decision value at the end of Phase 4 of round $r_1$, and so it delivers that value and decides—a contradiction to the assumption that no process in P decides.

We now show that if $|P|>\lfloor n/2 \rfloor$ and all processes in P propose a value, then all processes in P eventually decide. By Lemma 17, we only need to show that some process in P decides. For contradiction, suppose that no process in P decides. We claim that no process in P remains blocked forever at one of the wait statements. This claim implies that every process in P starts every round r>0, and thus qr-sends an infinite number of messages, which contradicts what we have shown above. We prove the claim by contradiction. Let $r_0$ be the smallest round number in which some process in P blocks forever at one of the wait statements. Since all processes in P propose and do not decide, they all reach the end of Phase 1 of round $r_0$: they all qr-send a message of the type $(*,r_0,\text{estimate},*)$ to the current coordinator $c=(r_0 \bmod n)+1$. Thus, at least $\lceil (n+1)/2 \rceil$ such messages are qr-sent to c. There are now two cases: (1) $c \in P$. Then c qr-receives those messages and replies by qr-sending $(c, r_0, \text{estimate}_c)$. Thus c completes Phase 2 of round $r_0$. Moreover, every process in P qr-receives this message, and so every process in P completes Phase 3 of round $r_0$. Thus every process in P qr-sends a message of the type $(*,r_0, \text{ack})$ or $(*,r_0, \text{nack})$ to c, and so c completes Phase 4 of round $r_0$. We conclude that every process in P completes round $r_0$—a contradiction. (2) $c \notin P$. Then, by the Strong Completeness property of $\Diamond S_{LP}$, all processes in P eventually suspect c forever, and thus they do not block at the wait statement in Phase 3 of round TO. Therefore, all processes in P complete round $r_0$—a contradiction.

Lemma 21 For every partition P, QuiescentDecision(P) holds.

Proof (Sketch). Define a binary relation -.-* on the set Partitions as follows: for every P, Q ∈ Partitions, P --* Q if and only if P≠Q and there is a fair path from some process in P to some process in Q. Clearly -–- is an irreflexive partial order. The claim is shown by structural induction on -'--*. Let P be any partition and assume that, for every Q such that Q -'.* P. QuiescentDecision(Q) holds. We must show that QuiescentDecision(P) also holds.

Let Q be any partition such that Q -'.-* P. Since QuiescentDecision(Q) holds, every process $q \in Q$ eventually stops qr-sending messages. So, by the Integrity property of qr-send and qr-receive, there is a time after which no process in P qr-receives messages from processes in Q.

Now let Q be any partition such that Q '/+ P and Q~P. For all processes $q \in Q$ and $p \in P$. there is no fair path from q to p, and so p is not reachable from q. By the Partition Integrity property of qr-send and qr-receive, eventually p does not qr-receive messages from q. So, eventually no process in P qr-receives messages from processes in Q.

We conclude that eventually no process in P qr-receives messages from processes in any partition Q≠P. Moreover, eventually no process in P qr-receives messages from faulty processes. Thus, there is a time after which no process in P qr-receives messages from processes in $\Pi\backslash P$. Therefore, by Lemma 20, QuiescentDecision(P) holds.

Corollary 22 (Termination) Assume that the largest partition contains a majority of processes. if all processes in the largest partition propose a value, then they all eventually decide.

Proof. Let P be the largest partition. By assumption, $|P|>\lfloor n/2 \rfloor$. Apply Lemma 21.

Corollary 23 (Quiescence) By plugging the quiescent implementations of qr-send, qr-receive, broadcast, and deliver of Section 4.3 into the algorithm of FIG. 3, we obtain a quiescent algorithm.

Proof. By Lemma 19, each process invokes only a finite number of broadcasts. Moreover, each process also invokes only a finite number of qr-sends: for a process that crashes, this is obvious, and for a correct process, this is a consequence of Lemma 21. The result now follows since the implementations of broadcast and qr-send in Section 4.3 are quiescent.

From Lemmata 15, 16, 17 and 18, and Corollaries 22 and 23, we have:

Theorem 24 Consider the algorithm obtained by plugging the implementations of qr-send, qr-receive, broadcast and deliver of Section 4.3 into the algorithm of FIG. 3. This algorithm is quiescent, and satisfies the following properties of consensus: Uniform Agreement, Uniform Validity, Uniform Integrity, and Partition Termination. Moreover—if the largest partition contains a majority of processes, then it also satisfies Termination.

6 Implementation of HB for Partitionable Networks

We now show how to implement HB for partitionable networks. Our implementation (FIG. 4) is a minor modification of the one given in [ACT97a] for non-partitionable networks. Every process p executes two concurrent tasks. In the first task, p periodically increments its own heartbeat value, and sends the message (HEARTBEAT,p) to all its neighbors. The second task handles the receipt of messages of the form (HEARTBEAT, path). Upon the receipt of such a message from process q, p increases the heartbeat values of all the processes that appear after p in path. Then p appends itself to path and forwards message (HEARTBEAT, path) to all its neighbors that appear at most once in path.

Note that HB does not attempt to use timeouts on the heartbeats of a process in order to determine whether this process has failed or not. HB just counts the total number of heartbeats received from each process, and outputs these "raw" counters without any further processing or interpretation.

Thus, HB should not be confused with existing implementations of failure detectors (some of which, such as those in Ensemble and Phoenix, have modules that are also called heartbeat [vR97, Cha97]). Even though existing failure detectors are also based on the repeated sending of a heartbeat, they use timeouts on heartbeats in order to derive lists of processes considered to be up or down; applications can only see these lists. In contrast, HB simply counts heartbeats, and shows these counts to applications.

We now proceed to prove the correctness of the implementation.

Lemma 25 At each process p, the heartbeat sequence of every process q is nondecreasing.

Proof. This is clear since $D_p[q]$ can only be changed in lines 9 and 15.

Lemma 26 At each correct process p, the heartbeat sequence of every process in the partition of p is unbounded.

Proof. Let q be a process in the partition of p. If q=p then line 9 is executed infinitely many times (since p is correct), and so the heartbeat sequence of p at p is unbounded. Now assume q≠p and let $(p_1, p_2, \ldots, p_i)$ be a simple fair path from p to q, and $(p_i, p_i, \ldots, p_k)$ be a simple fair path from q to p, so that $p_1=p_k=p$ and $p_1=q$. For j=1, ..., k, let $p_j=(p_1=p_j)$. For each j=1, ..., k-1, we claim that $p_j$ sends (HEARTBEAT, $p_j$) to $p_{j+1}$ an infinite number of times. We show this by induction on j. For the base case (j=1), note that $p_1=p$ is correct, so its Task 1 executes forever and therefore $p_1$ sends (HEARTBEAT, $p_j$) to all its neighbors, and thus to $p_2$, an infinite number of times. For the induction step, let j<k−1 and assume that $p_j$ sends (HEARTBEAT, $P_j$) to $p_{j+1}$ an infinite number of times. Since $p_{j+1}$ is correct and the link $p_j \rightarrow p_{j+1}$ is fair, $p_{j+1}$ receives (HEARTBEAT, $p_j$) an infinite number of times. Moreover, $p_{j+2}$ appears at most once in $p_{j+1}$ and $p_{j+2}$ is a neighbor of $p_{j+1}$, so each time $p_{j+1}$ receives (HEARTBEAT, $p_j$), it sends (HEARTBEAT, $p_{j+1}$) to $p_{j+2}$ in line 18. Therefore, $p_{j+1}$ sends (HEARTBEAT, $p_{j+1}$) to $p_{j+2}$ an infinite number of times. This shows the claim.

For j=k−1 this claim shows that $p_{k-1}$ sends (HEARTBEAT, $p_{k-1}$) to $p_k$ an infinite number of times. Process $p_k$ is correct and link $p_{k-1} \rightarrow p_k$ is fair, so $p_k$ receives (HEARTBEAT, $p_{k-1}$) an infinite number of times. Note that q appears after p in $p_{k-1}$. So every time $p_k$ receives (HEARTBEAT, $p_{k-1}$), it increments $D_{pk}[q]$ in line 15. So $D_{pk}[q]$ is incremented an infinite number of times. Note that, by Lemma 25, $D_{pk}[q]$ can never be decremented. So, the heartbeat sequence of q at $p_k=p$ is unbounded.

Corollary 27 (HB-Accuracy) At each process p, the heartbeat sequence of every process is nondecreasing, and at each correct process p, the heartbeat sequence of every process in the partition of p is unbounded.

Proof. From Lemmata 25 and 26.

Lemma 28 If some process p sends (HEARTBEAT, path) then (1) p is the last process in path and (2) no process appears more than twice in path.

Lemma 29 Let p and q be processes, and path be a sequence of processes. Suppose that p receives message (HEARTBEAT, path . q) an infinite number of times. Then q is correct and link q→p is fair. Moreover, if path is non-empty, then q receives message (HEARTBEAT, path) an infinite number of times.

Proof. Let M be the message (HEARTBEAT, path . q) and let $M_0$ be the message (HEARTBEAT, path). Suppose p receives M an infinite number of times. Then p receives M from some process p' an infinite number of times. Clearly there is a link from p' to p, and by the Integrity property of this link, p' sends M to p an infinite number of times, and thus p' is also correct. By Lemma 28 part (1), we have q=p'. Link q→p does not crash, because otherwise p would receive messages from q only a finite number of times. Therefore link q→p is fair. Moreover, if path is non-empty, then the length of path·q is at least two, and thus q can only send M in line 18. So q only sends M if it receives $M_0$. Therefore q receives $M_0$ an infinite number of times.

Lemma 30 (HB-Completeness) At each correct process p, the heartbeat sequence of every process not in the partition of p is bounded.

Proof (Sketch). Let q be a process that is not in the partition of p. Note that q≠p. For a contradiction, suppose that the heartbeat sequence of q at p is not bounded. Then p increments $D_p[q]$ an infinite number of times in line 15. So, for an infinite number of times, p receives messages of the form (HEARTBEAT, *) with a second component that contains q after p. Lemma 28 part (2) implies that the second component of a message of the form (HEARTBEAT, *) ranges over a finite set of values. Thus there exists a path containing q after p such that p receives (HEARTBEAT, path) an infinite number of times. Let path=$(p_1, \ldots, p_k)$. For convenience, let p=$p_{k+1}$. By repeated applications of Lemma 29, we conclude that for each j=k, k−1, ..., 1, $p_j$ is correct and link $p_j \rightarrow p_{j+1}$ is fair. Let i,i' ∈ {1, ..., k} be such that $p_i=p, p_{i'}=q$ and i<i'. Thus $(p_i, p_{i+1}, \ldots, p_{i'})$ is a fair path from p to q and $(p_{1'}, p_{1'+1}, \ldots, p_k, p)$ is a fair path from q to p. Therefore p and q are in the same partition—a contradiction.

By Corollary 27 and the above lemma, we have:

Theorem 31 FIG. 4 implements 7-LB for partitionable networks.

7 Related Work

Regarding reliable communication, the works that are closest to ours are [BCBT96, ACT97a]. Both of these works, however, consider only non-partitionable networks. In [BCBT96], Basu et al. pose the following question: given a problem that can be solved in asynchronous systems with process crashes only, can this problem still be solved if links can also fail by losing messages? They show that the answer is "yes" if the problem is correct-restricted [BN92, Gop92] or if more than half of the processes do not crash. However, the communication algorithms that they give are not quiescent (and do not use failure detectors). [ACT97a] was the first paper to study the problem of achieving quiescent reliable communication by using failure detectors in a system with process crashes and lossy links.

Regarding consensus, the works that are closest to ours are [FKM+95, CHT96a, DFKM96, GS96]. In [GS96], as a first step towards partitionable networks, Guerraoui and Schiper define ⌈-accurate failure detectors. Roughly speaking, only a subset ⌈ of the processes are required to satisfy some accuracy property. However, their model assumes that the network is completely connected and links between correct processes do not lose messages—thus, no permanent partition is possible.
i.e., its specification refers only to the behavior of non-faulty processes.

The first paper to consider the consensus problem in partitionable networks is [FKM+95], but the algorithms described in that paper had errors [CHT96a]. Correct algorithms can be found in [CHT96a, DFKM96]. All these algorithms use a variant of $\Diamond S$, but in contrast to the one given in this paper they do not use HB and are not quiescent: processes in minority partitions may send messages forever. Moreover, these algorithms assume that (a) the largest partition is eventually isolated from the rest of the system: there is a time after which messages do not go in or out of this partition, and (b) links in the largest partition can lose only a finite number of messages (recall that in our case, all links may lose an infinite number of messages). The underlying model of failures and failure detectors is also significantly different from the one proposed in this paper. Another model of failure detectors for partitionable networks is given in [BDM97]. We compare models in the next section.
Actually, the specification of consensus considered in (FYJ-4+95 CHT96a) only requires that one correct process in the largest partition eventually decides. Ensuring that all correct processes in the largest partition decide can be subsequently achieved by a (quiescent) reliable broadcast of the decision value.

8 Comparison with other Models

In [DFKM96, BDM97], network connectivity is defined in terms of the messages exchanged in a run—in particular, it depends on whether the algorithm being executed sends a message or not, on the times these messages are sent, and on whether these messages are received. This way of defining network connectivity, which is fundamentally different from ours, has two drawbacks. First, it creates the following cycle of dependencies: (a) The messages that an algorithm sends in a particular run depend on the algorithm itself and on the behavior of the failure detector it is using, (b) the behavior of the failure detector depends on the network connectivity, and (c) the network connectivity depends on the messages that the algorithm sends. Second, it raises the following issue: are the messages defining network connectivity, those of the applications, those of the failure detection mechanism, or both?

In our model, network connectivity does not depend on messages sent by the algorithm, and so we avoid the above drawbacks. In fact, network connectivity is determined by the (process and link) failure pattern which is defined independently of the messages sent by the algorithm. In particular, the link failure pattern is intended to model the physical condition of each link independent of the particular messages sent by the algorithm being executed.

In [DFKM96], two processes p and q are permanently connected in a given run if they do not crash and there is a time after which every message that p sends to q is received by q, and vice-versa. Clearly, network connectivity depends on the messages of the run.

In [BDM97], process q is partitioned from p at time t if the last message that p sent to q by time $t' \leq t$ is never received by q. This particular way of defining network connectivity in terms of messages is problematic for our purposes, as the following example shows.

A process p wishes to send a sequence of messages to q. For efficiency, the algorithm of p sends a message to q only when p's failure detector module indicates that q is currently reachable from p (this is not unreasonable: it is the core idea behind the use of failure detector HB to achieve quiescent reliable communication). Suppose that at time t, p sends m to q, and this message is lost (it is never received by q). By the definition in [BDM97], q is partitioned from p at time t. Suppose that the failure detector module at p now tells p (correctly) that q is partitioned from p. At this point, p stops sending messages to q until the failure detector says that q has become reachable again. However, since p stopped sending messages to q, by definition, q remains partitioned from p forever, and the failure detector oracle (correctly) continues to report that q is unreachable from p. forever. Thus, the loss of a single message discourages p from ever sending messages to q again.

A possible objection to the above example is that the failure detector module at p is not just an oracle with axiomatic properties, but also a process that sends its own messages to determine whether q is reachable or not. Furthermore, these failure detector messages should also be taken into account in the definition of network connectivity (together with the messages exchanged by the algorithms that use those failure detectors). However, this defeats one of the original purpose of introducing failure detection as a clean abstraction to reason about fault tolerance. The proof of correctness of an algorithm (such as the one in the simple example above) should refer only to the abstract properties of the failure detector that it uses, and not to any aspects of its implementation.

As a final remark, the model of [BDM97] is not suitable for our results because of the following. Consider a completely connected network in which all links are bidirectional and fair. Let R be any run in which every link p→q loses messages from time $t_0$ time (but every message repeatedly sent is eventually received). In run R, by the definitions in [BDM97]: (a) neither q remains partitioned from p, nor q remains reachable from p, and (b) an Eventually Perfect failure detector $\Diamond P$ is allowed to behave arbitrarily. Therefore, with the definitions in [BDM97], $\Diamond P$ cannot be used to solve consensus in such a network. Our model was designed to deal with fair links explicitly, and consensus can be solved even with $\Diamond S$.
We do not want to hide the retransmissions that fair links require, since our main goal is to design algorithms that ensure that such retransmissions eventually subside.

Acknowledgments

We would like to thank Anindya Basu, Tushar Deepak Chandra, Francis Chu, and Vassos Hadzilacos for their helpful comments.
[ACT97aI Marcos Kawazoe Aguilera, Wei Chen, and Sam Toueg. Heartbeat: a timeout-free failure detector for quiescent reliable communication. Technical Report 97-1631, Department of Computer Science, Cornell University, May 1997.
[ACT97bI Marcos Kawazoe Aguilera, Wei Chen, and Sam Toueg. On the weakest failure detector to achieve quiescence. Manuscript, April 1997.

[BCBT96] Anindya Basu, Bernadette Charron-Bost, and Sam Toueg. Simulating reliable links with unreliable links in the presence of process crashes. In *Proceedings of the 10th International Workshop on Distributed Algorithms*, Lecture Notes on Computer Science, pages 105–122. Springer-Verlag, October 1996.

[BDM97] Ozalp Babao~lu, Renzo Davoli, and Alberta Montresor. Partitionable group membership: specification and algorithms. Technical Report UBLCS-97-1, Dept. of Computer Science, University of Bologna, Bologna, Italy, January 1997.

[BN921 Rida Bazzi and Gil Neiger. Simulating crash failures with many faulty processors. *In Proceedings of the 6th International Workshop on Distributed Algorithms*, Lecture Notes on Computer Science, pages 166–184. Springer-Verlag, 1992.

[Cha97] Tushar Deepak Chandra, April 1997. Private Communication.

[CHT96aI Tushar Deepak Chandra, Vassos Hadzilacos, and Sam Toueg, March 1996. Private Communication to the authors of [FKM+95].

[CHT96b] Tushar Deepak Chandra, Vassos Hadzilacos, and Sam Toueg. The weakest failure detector for solving consensus. *Journal of the ACM*, 43(4):685–722, July 1996.

[CT96]Tushar Deepak Chandra and Sam Toueg. Unreliable failure detectors for reliable distributed systems. *Journal of the ACM*, 43(2):225–267, March 1996.

[DFKM96] Danny Dolev, Roy Friedman, Idit Keidar, and Dahlia Mafichi. Failure detectors in omission failure environments. Technical Report TR96-1608, Department of Computer Science, Cornell University, Ithaca, N.Y., September 1996.

[FKM+95] Roy Friedman, Idit Keidar, Dahlia Malkhi, Ken Birman, and Danny Dolev. Deciding in partitionable networks. Technical Report TR95-1554, Department of Computer Science, Cornell University, Ithaca, N.Y., November 1995.

[FLP85] Michael J. Fischer, Nancy A. Lynch, and Michael S. Paterson. Impossibility of distributed consensus with one faulty process. *Journal of the ACM*, 32(2):374–382, April 19~5.

[Gop92] Ajei Gopal. *Fault-Tolerant Broadcasts and Multicasts: The Problem of Inconsistency and Contamination*. PhD thesis, Cornell University, January 1992.

[GS96]Rachid Guerraoui and Andr6 Schiper. Gamma-Accurate failure detectors. *In Proceedings of the 10th International Workshop on Distributed Algorithms*, Lecture Notes on Computer Science, pages 269–286. Springer-Verlag, October 1996.

[vR97] Robbert van Renesse, April 1997. Private Communication.

What is claimed is:

1. A method for detecting a failure in communication between two nodes on a network comprising the steps of:
   at a first node, transmitting a heartbeat to other nodes and counting heartbeats of the other nodes;
   sending messages from a first node to a second node as long as the count of the heartbeats for the second node at the first node increases;
   interrupting messages addressed from the first node to the second node when the count of the heartbeats of the second node at the first node stop; and
   resuming sending messages from the first node to the second node when the heartbeat counts of the second node at the first node increases.

2. The method of claim 1 wherein the network is a computer network.

3. The method of claim 2 wherein the network is a token ring network, an Ethernet network, a wireless network, a cellular network or a packet switching network.

4. The method of claim 1 wherein the network is a switched network.

5. The method of claim 4 wherein the switched network is a telephone network and further comprises a wired, wireless or cellular telephone network.

6. The method of claim 1 wherein the first node counts the heartbeats of the second node after the first node sends and message and resends the message when the counts of the heartbeat of the second node increases.

7. The method of claim 1 wherein the first node sends no further messages to the second node until the heartbeat of the second node increases.

8. The method of claim 1 wherein each node in the network counts the heartbeats of other nodes to which the first node sends messages.

9. The method of claim 8 wherein each node counts all the heartbeats of the other nodes.

10. A heartbeat detector comprising for detecting a failure in communication between two nodes on a network comprising:
    means for transmitting a heartbeat to nodes on a network and for receiving heartbeat signals from other nodes on the network;
    means for counting heartbeats received from each of the other nodes transmitting heartbeat signals;
    means for storing a count of each heatbeat signal for each node;
    means for sending messages to another node as long as the count of the heartbeats for said other node increases;
    means for interrupting messages addressed to said other node when the count of the heartbeats for the other node stops; and
    means for resuming sending messages to said other node when the heartbeat counts of the other node at the first node increases.

11. The heartbeat detector of claim 1 adapted to connect to a computer network.

12. The heartbeat detector of claim 11 adapted to connect to a token ring network, an Ethernet network, a wireless network, a cellular network or a packet switching network.

13. The heartbeat detector of claim 11 adapted to connect to a switched network.

14. The heartbeat detector of claim 13 adapted to connect to a wired, wireless or cellular telephone network.

15. The heartbeat detector of claim 11 wherein the heartbeat detector counts the heartbeats of said other node after the heatbeat detector sends a message and resends the message when the counts of the heartbeat of said other node increases.

16. The heartbeat detector of claim 11 wherein the heartbeat detector sends no further messages to said other node until the heartbeats of said second node counted at the heartbeat detector increases.

17. The heartbeat detector of claim 11 wherein the heatbeat detector counts all the heartbeats of all the other nodes.

18. A method for providing quiescent communication in a partitionalbe network comprising the steps of:
    at each node repeatedly sending heartbeat signals to neighbor nodes;
    appending a node address to heartbeat signals generated by each node;
    receiving heartbeat signals from neighbor nodes;
    at each node recording from the received heartbeat signals the appended addresses of nodes that precede the address of the receiving node;

passing received heartbeat signals to neighbor nodes so long as the address of the neighbor node is appended one or less times to the received heartbeat signals; and serially appending a node address to each received heartbeat signal that is passed to neighbor nodes.

19. The method of claim 18 wherein each node increments a heartbeat counter for itself when it sends a heartbeat signal.

20. The method of claim 18 wherein the step of passing stops if the address of the receiving node is appended more than twice.

21. A method for providing quiescent communication in a network comprising the steps of:

at each node repeatedly sending heartbeat signals to each neighbor nodes;

appending a node address to heartbeat signals generated by each node to record the path taken by the sent heartbeat signal;

receiving heartbeat signals from neighbor nodes;

at each node incrementing respective counters for each neighbor node when a neighbor node address appears appended to the path of a received heartbeat signal; and resending the received heatbeat signal to all other nodes not appended to the path of the received heartbeat signal.

22. A heatbeat detector for a node of a computer network to provide quiescent communication in the network comprising:

means for repeatedly sending heartbeat signals to nodes on the network that are neighbors of the heatbeat detector;

appending an address for the heartbeat detector to all heartbeat messages sent by the node and to all heartbeat signals generated by by the heartbeat detector;

means for receiving heartbeat signals from neighbor nodes;

a counter for each neighbor node and means for incrementing the respective counters when a neighbor node address appears appended to the heartbeat signal received by the heartbeat detector; and means for resending the received heatbeat signal to all other nodes not appended to the path of the received heatbeat signal.

23. A method for providing quiescent broadcast communication over a partitionable network comprising the steps of:

broadcasting a message m in the form m, got_msg, path from a first node p to other nodes qs in a network where got_msg is an acknowledgement of receipt of the message and the path includes addresses for each node that receives and forwards the message;

initializing heartbeat detectors at each node, including a heartbeat detector at p for counting the heartbeats of each q at p;

receiving messages at p;

at the p node storing got_msg data about receipt of the message by the other nodes;

if the stored data at p indicates a neighbor q has not received m and the heartbeat of q at p has increased, sending a message from p containing m to q and to all neighbors whose heartbeat has increased;

appending the address of p to messages sent by p;

forwarding the new message with the appended path to all neighbors that appear at most once in the path.

24. The method of claim 23 wherein the heartbeat detector counts the heartbeats received at each node from each of the other nodes.

25. A heartbeat detector for providing quiescent broadcast communication over a partitionable network comprising:

means for broadcasting a message m in the form m, got_msg, path from a first node p to other nodes qs in a network where got_msg is an acknowledgement of receipt of the message and the path includes addresses for each node that receives and forwards the message;

means for initializing heartbeat detectors at each node, including a heartbeat detector at p for counting the heartbeats of each q at p;

means for receiving messages at p;

means for storing got_msg data about receipt of the message by the other nodes; if the stored data at p indicates a neighbor q has not received m the heartbeat of q at p has increased, means for sending a message from p containing m to q and to all neighbors whose heartbeat has increased;

means for appending the address of p to messages sent by p;

means for forwarding the new message with the appended path to all neighbors that appear at most once in the path.

26. The heartbeat detector of claim 25 wherein the heartbeat detector counts the heartbeats received from each of the other nodes.

* * * * *

UNITED STATES PATENT AND TRADEMARK OFFICE
CERTIFICATE OF CORRECTION

| | | |
|---|---|---|
| PATENT NO. | : 6,728,781 B1 | |
| APPLICATION NO. | : 09/310546 | |
| DATED | : April 27, 2004 | |
| INVENTOR(S) | : Marcus K. Aguilera, Wei Chen and Sam Toueg | |

It is certified that error appears in the above-identified patent and that said Letters Patent is hereby corrected as shown below:

Page 41, Column 50, line 58 to line 67 and Page 2, Column 51, lines 1 to 5, the entire claim should appear as follows:

18. A method for providing quiescent communication in a partitionable network comprising the steps of:
at each node repeatedly sending heartbeat signals to neighbor nodes; appending a node address to heartbeat signals generated by each node; receiving heartbeat signals from neighbor nodes; wherein each node comprises a counter for each neighbor node;
at each node incrementing the respective counters when a neighbor node address appears appended to the heartbeat signals;
passing received heartbeat signals to neighbor nodes so long as the address of the neighbor node is appended one or less times to the received heartbeat signals; serially appending a node address to each received heartbeat signal that is passed to neighbor nodes.

Page 42, Column 51, line 46 to line 50 and Column 52, lines 1 to 18, the entire claim should appear as follows:

23. A method for providing quiescent broadcast communication over a partitionable network comprising the steps of: broadcasting a message m in the form m, got_msg, path from a first node p to other nodes qs in a network where got_msg is an acknowledgement of receipt of the message and the path includes addresses for each node that receives and forwards the message; said other nodes comprise a counter and means for incrementing the respective counters when a node address appears appended to the heartbeat signal; initializing heartbeat detectors at each node, including a heartbeat detector at p for counting the heartbeats of each q at p; receiving messages at p; at the p node storing got_msg data about receipt of the message by the other nodes; if the stored data at p indicates a neighbor q has not received m and the heartbeat of q at p has increased, sending a message from p containing m to q and to all neighbors whose heartbeat has increased; appending the address of p to messages sent by p; forwarding the new message with the appended path to all neighbors that appear at most once in the path.

UNITED STATES PATENT AND TRADEMARK OFFICE
CERTIFICATE OF CORRECTION

| | | |
|---|---|---|
| PATENT NO. | : 6,728,781 B1 | |
| APPLICATION NO. | : 09/310546 | |
| DATED | : April 27, 2004 | |
| INVENTOR(S) | : Marcus K. Aguilera, Wei Chen and Sam Toueg | |

It is certified that error appears in the above-identified patent and that said Letters Patent is hereby corrected as shown below:

Page 42, Column 52, line 22 to line 46, the entire claim should appear as follows:

25. A heartbeat detector for providing quiescent broadcast communication over a partitionable network comprising:
means for broadcasting a message m in the form m, got_msg, path from a first node p to other nodes qs in a network where got_msg is an acknowledgement of receipt of the message and the path includes addresses for each node that receives and forwards the message; means for initializing heartbeat detectors at each node, including a heartbeat detector atp for counting the heartbeats of each q at p; means for incrementing the respective counters when a node address appears appended to the heartbeat signal received by the heartbeat detector; means for receiving messages at p; means for storing got_msg data about receipt of the message by the other nodes; if the stored data at p indicates a neighbor q has not received m and the heartbeat of q at p has increased, means for sending a message from p containing m to q and to all neighbors whose heartbeat has increased;
means for appending the address of p to messages sent by p; means for forwarding the new message with the appended path to all neighbors that appear at most once in the path.

Signed and Sealed this

Second Day of October, 2007

JON W. DUDAS
*Director of the United States Patent and Trademark Office*